United States Patent
Kozloski

(10) Patent No.: US 10,489,706 B2
(45) Date of Patent: *Nov. 26, 2019

(54) DISCOVERING AND USING INFORMATIVE LOOPING SIGNALS IN A PULSED NEURAL NETWORK HAVING TEMPORAL ENCODERS

(71) Applicant: International Business Machines Corporation, Armonk, NY (US)

(72) Inventor: James R. Kozloski, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 814 days.

This patent is subject to a terminal disclaimer.

(21) Appl. No.: 14/745,769

(22) Filed: Jun. 22, 2015

(65) Prior Publication Data

US 2016/0224888 A1 Aug. 4, 2016

Related U.S. Application Data

(63) Continuation of application No. 14/610,570, filed on Jan. 30, 2015.

(51) Int. Cl.
*G06N 3/06* (2006.01)
*G06N 3/04* (2006.01)

(52) U.S. Cl.
CPC ............ *G06N 3/061* (2013.01); *G06N 3/04* (2013.01)

(58) Field of Classification Search
None
See application file for complete search history.

(56) References Cited

U.S. PATENT DOCUMENTS 4,797,582 A 1/1989 Nguyen et al.
5,170,071 A * 12/1992 Shreve ............... G06N 3/0472
706/25

(Continued)

FOREIGN PATENT DOCUMENTS

| CN | 103201610 A | 7/2013 |
| WO | 2012169726 A1 | 12/2012 |
| WO | 2013169805 A2 | 11/2013 |

OTHER PUBLICATIONS

Zhang et al. Configurable Neural Phase Shifter with Spike Timing Dependent Plasticity. IEEE Electron Device Letters • Aug. 2010 (Year: 2010).*

(Continued)

*Primary Examiner* — Alexey Shmatov
*Assistant Examiner* — Robert Bejcek, II
(74) *Attorney, Agent, or Firm* — Cantor Colburn LLP; Anthony Curro

(57) ABSTRACT

Embodiments are directed to a computer implemented method of implementing a network having pathways. The method includes communicating among a plurality of units through the pathways. The method further includes identifying informative looping signals in loops formed from a plurality of network pathways that connect a first one of the plurality of units to a second one of the plurality of units. The method further includes applying spike-timing dependent plasticity (STDP) dependent inhibitory gating to the plurality of network pathways. The method further includes phase shifting open gates and close gates in the loop by applying STDP functions to open gate outputs and closed gates outputs. The method further includes making a rate and a direction of the phase shift dependent on a modulatory signal, wherein the modulatory signal is based at least in part on a change in the STDP-dependent inhibitory gating.

7 Claims, 25 Drawing Sheets

(56) References Cited

U.S. PATENT DOCUMENTS

| | | | |
|---|---|---|---|
| 6,239,345 | B1 | 5/2001 | Laroche |
| 8,473,439 | B2 | 6/2013 | Arthur et al. |
| 8,606,732 | B2 | 12/2013 | Venkatraman et al. |
| 8,645,291 | B2 | 2/2014 | Hawkins et al. |
| 8,682,822 | B2 | 3/2014 | Modha et al. |
| 2003/0021235 | A1 | 1/2003 | Arima |
| 2012/0084241 | A1 | 4/2012 | Friedman et al. |
| 2012/0109864 | A1 | 5/2012 | Modha |
| 2014/0219497 | A1 | 8/2014 | Richert |
| 2014/0229411 | A1 | 8/2014 | Richert et al. |
| 2014/0258194 | A1 | 9/2014 | Towal et al. |
| 2014/0317035 | A1 | 10/2014 | Azatmary et al. |
| 2016/0224885 | A1 | 8/2016 | Kozloski |

OTHER PUBLICATIONS

Popovych et al. Delay- and Coupling-Induced Firing Patterns in Oscillatory Neural Loops. PRL 107, 228102 (2011) (Year: 2011).*

Florian, Razvan. Reinforcement Learning Through Modulation of Spike-Timing-Dependent Synaptic Plasticity. Neural Computation 19, 1468-1502 (2007) (Year: 2007).*

Yoshioka et al., Spike-Timing-Dependent Synaptic Plasticity to Learn Spatiotemporal Patterns in Recurrent Neural Networks. J. Marques de Sa et al. (Eds.): ICANN 2007, Part I, LNCS 4668, pp. 757-766, 2007. (Year: 2007) (Year: 2007).*

Atuti et al., CMOS Pulse-Modulation Circuit Implementation of Phase-Locked Loop Neural Networks. 2008 IEEE International Symposium on Circuits and Systems (Year: 2008) (Year: 2008).*

Gerstner, Wulfram. Time structure of the activity in neural network models. Physical Review E vol. 51, No. 1 Jan. 1995 (Year: 1995) (Year: 1995).*

List of IBM Patents or Patent Applications Treated as Related—Date Filed: Aug. 3, 2015; 2 page.

James R. Kozloski, "Discovering and Using Informative Looping Signals in a Pulsed Neural Network Having Temporal Encoders" U.S. Appl. No. 14/610,570, filed Jan. 30, 2015.

Brunak et al., "Neural networks: computers with intuition," World Scientific, 1990.

Felleman et al., "Distributed Hierarchical Processing in the Primate Cerebral Cortex," Cerebral Cortex 1, 1991, pp. 1-47.

Fino et al., "Distinct coincidence detectors govern the corticostriatal spike timing-dependent plasticity," J. Physiol 588.16 (2010), pp. 3045-3062.

Gilson et al., "Emergence of network structure due to spike-timing-dependent plasticity in recurrnet neuronal networks III: Partially connected neurons driven by spontaneous activity," Biological Cybernetics 101 (2009): 411-426.

Gurney et al., "A new framework for cortico-striatal plasticity: behavioural theory meets in vitro data at the reinforcement-action interface," PLoS Biology 13.1 (2015): e1002034, 25 pages.

Helie et al., "Exploring the cognitive and motor functions of the basal ganglia: an integrative review of computational cognitive neuroscience models," Frontiers in computational neuroscience 7 (2013): 1-16.

Jain et al., "Artificial Neural Networks: A Tutorial," Computer 3, 1996, pp. 31-44.

Kozloski et al., "A theory of loop formation and elimination by spike timing-dependent plasticity," Frontiers in Neural Circuits, vol. 4, Article 7, 2010, pp. 1-11.

Linsker, "A Local Learning Rule That Enables Information Maximization for Arbitrary Input Distributions," Neural Computation 9, 1997, pp. 1661-1665.

Pawlak et al., "Dopamine Receptor Activation Is Required for Corticostriatal Spike-Timing-Dependent Plasticity," J. Neurosci. 28(10), 2008, pp. 2435-2446.

Ramakrishnan et al., "Floating Gate Synapses With Spike-Time-Dependent Plasticity," IEEE Transactions on Biomedical Circuits and Systems 5.3, 2011, pp. 244-252.

Rempel-Clower et al., "The Laminar Pattern of Connections between Prefrontal and Anterior Temporal Cortices in the Rhesus Monkey is Related to Cortical Structure and Function," Cerebral Cortex 10.9, 2000, pp. 851-865.

Snider, "Spike-Timing-Dependent Learning in Memristive Nanodevices," 2008 IEEE International Symposium on Nanoscale Architectures (NANOARCH 2008), IEEE, pp. 85-92.

Triarhou, "Constantin von Economo (1876-1931)," Journal of Neurology 254.4 (2007): 550-551.

Van Rossum et al., "Stable Hebbian learning from Spike Timing-Dependent Plasticity," The Journal of Neuroscience 20.23 (2000): 8812-8821.

* cited by examiner

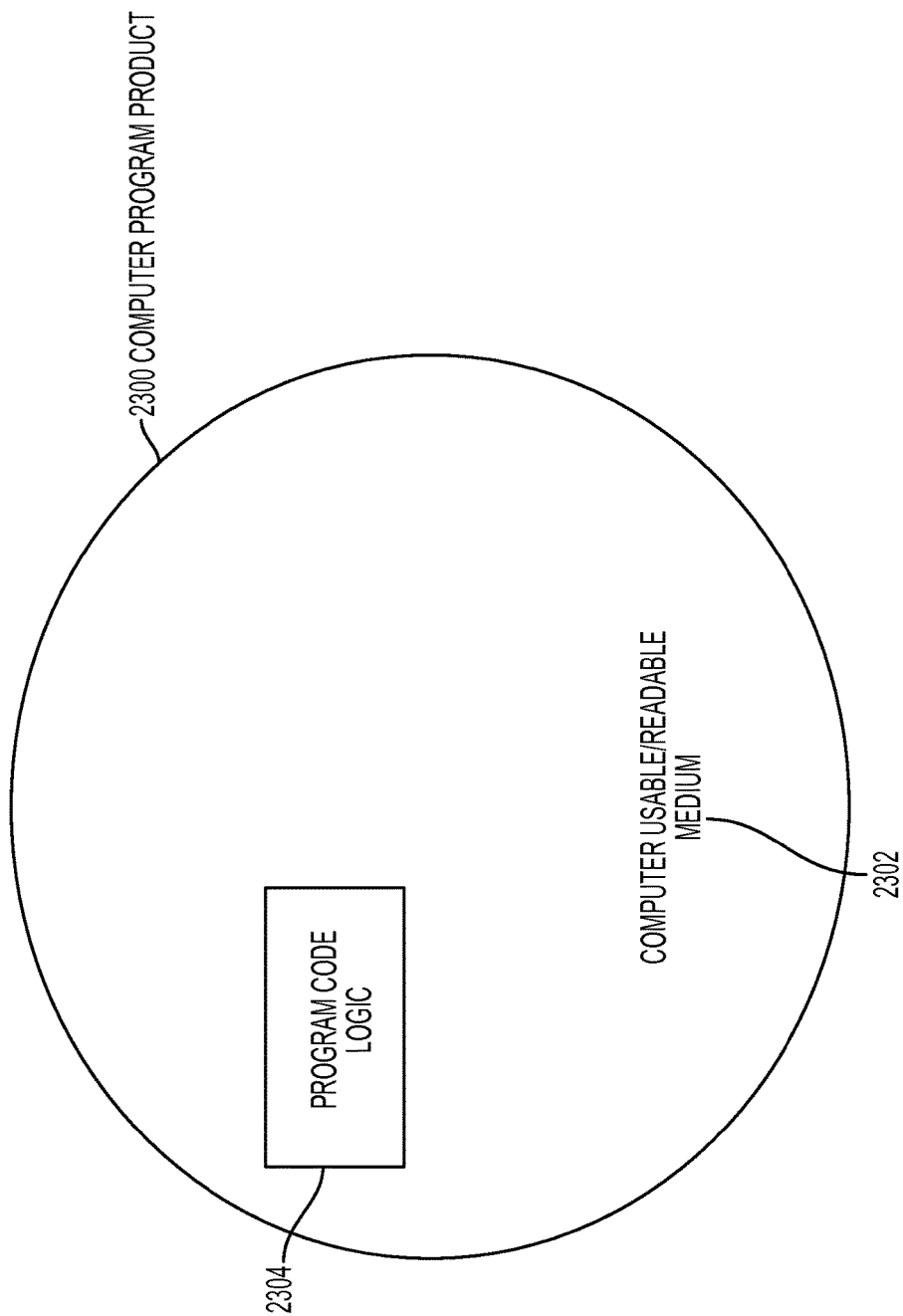

DISCOVERING AND USING INFORMATIVE LOOPING SIGNALS IN A PULSED NEURAL NETWORK HAVING TEMPORAL ENCODERS

DOMESTIC PRIORITY

This application is a continuation of U.S. patent application Ser. No. 14/610,570, titled "DISCOVERING AND USING INFORMATIVE LOOPING SIGNALS IN A PULSED NEURAL NETWORK HAVING TEMPORAL ENCODERS" filed Jan. 30, 2015, the content of which is incorporated by reference herein in its entirety.

BACKGROUND

The present disclosure relates in general to the use of computer systems to model biological neural systems. More specifically, the present disclosure relates to modeling biological neural systems using computer systems that implement a pulsed neural network having temporal encoders and informative looping signals.

An animal's continually evolving perceptions of and behavioral responses to dynamic sensory stimuli must ultimately be derived from information contained within relatively brief segments of so-called spike trains generated by neurons. These spike trains, also known as pulses or action potentials, are voltage spikes that can travel down a nerve fiber. A typical neuron-generated spike train includes spatiotemporal patterns comprising localized events with a distinctive spatial and temporal structure. Although these events occur on a wide variety of spatial and temporal scales, a biological neural system such as the brain can integrate them and extract relevant pieces of information. Thus, biological neural systems impose order on information provided by noisy spatiotemporal sensory inputs.

The neuron is a central element of biological neural systems. The bulk of the brain is made up of structural cells known as glial cells and astrocytes. Lying among these structural cells are neurons that conduct electrical impulses along fibers. It has been estimated that the average human brain contains about 100 billion neurons and, on average, each neuron is connected to about 1000 other neurons. These neuron and their interconnections form vast and complex biological neural networks that are the mainstay of the brain's processing capabilities. Neurons are remarkable among the cells of the body in their ability to propagate signals such as spike trains or action potentials rapidly over large distances. So-called sensory neurons change their activities by firing sequences of action potentials in various temporal patterns in response to the presence of external stimuli, such as light, sound, taste, smell and touch. Information about a stimulus is encoded in this pattern of action potentials and transmitted into and around the brain.

In biological neural systems, the point of contact between an axon of one neuron and a dendrite of another neuron is called a synapse, and, with respect to the synapse, the two neurons are respectively called pre-synaptic and post-synaptic. Neurons, when activated by sufficient inputs received via synapses, emit spikes that are delivered to those synapses to which the neuron is pre-synaptic. Neurons can be either "excitatory" or "inhibitory." Synaptic conductance is a measure of the amount of influence a synapse will have on its post-synaptic target when the synapse is activated by a pre-synaptic spike. The synaptic conductance can change with time as a function of the relative spike times of pre-synaptic and post-synaptic neurons, as per spike-timing dependent plasticity (STDP). The standard STDP rule increases the conductance efficacy of a synapse if its post-synaptic neuron fires after its pre-synaptic neuron fires, and decreases the conductance efficacy of a synapse if the order of the two firings is reversed. A person's mental possession of individual experiences is stored in the conductance of signals across the trillions of synapses throughout the brain.

The computations underlying all aspects of the operation of a biological neural system are carried out within the context of the neural code with which the relevant information is represented in the spike trains. A determination of the information coding schemes used within biological neural systems is useful, not only because of the intrinsic interest in the nature of the neural code itself but also because of the constraints that knowledge of the code can place on the development of models for the mechanisms underlying biological neural computations.

Evolution has provided the human brain with many desirable characteristics not present in contemporary computer systems, including but not limited to massive parallelism, distributed representation and computation, learning ability, generalization ability, adaptability, inherent contextual information processing, fault tolerance and low energy consumption. Contemporary digital computers outperform humans in the domain of numeric computation and related symbol manipulation. However, humans can effortlessly solve complex perceptual problems (e.g., recognizing an acquaintance in a crowd from a mere glimpse of the person's face) at a speed and to an extent that dwarfs the fastest computer. A reason for such a remarkable difference in the performance of biological neural systems and computers is that the biological neural system architecture is completely different from a typical computer system architecture. This difference significantly affects the types of functions each computational model can best perform.

Artificial neural networks (ANNs), also known as neuromorphic and synaptronic systems, are computational systems that permit electronic systems to essentially function in a manner analogous to that of biological neural systems such as a human brain. In the present disclosure, any reference to an ANN is used in the broadest sense to cover a wide range of computer and electronic systems that model biological neural networks, including but not limited to pulsed neural networks (PNNs). ANNs do not generally utilize the traditional digital model of manipulating zeros and ones. Instead, a typical ANN creates connections between processing elements that are roughly functionally equivalent to neurons of a biological brain.

ANNs are often implemented as relatively large, parallel computing systems having many simple processors with many interconnections. Modeling a biological nervous system using ANNs (or PNNs) can contribute to a better understanding of biological functions. Many ANN models attempt to use some "organizational" principles believed to be used in the human brain. Contemporary computer hardware technology (such as VLSI and optical) has made such modeling feasible. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

A contemporary ANN is comprised of a network of artificial neurons (also known as "nodes"). These nodes are connected to each other, and the strength of their connections to one another is assigned a value. For example, connections may be identified as exhibiting inhibition (maximum inhibition being negative 1.0) or excitation (maximum excitation being plus 1.0). If the magnitude value of the connection is high, this indicates a strong connection. Within each node's design, a transfer function is also built in. There are three types of neurons in a typical ANN, namely input nodes, hidden nodes and output nodes.

Input nodes take in information that can be numerically expressed. The information is presented as activation values, wherein each node is given a number, and a number having a higher magnitude causes a greater activation. This information is then passed throughout the network. Based on the connection strengths or efficacy (weights), inhibition or excitation, and transfer functions, the activation value is passed from node to node. Each node sums the activation values it receives. Each node than modifies the value based on its transfer function. The activation flows through the network, through hidden layers, until it reaches the output nodes. The output nodes then reflect the input in a meaningful way to the outside world.

There are many types of neural networks, but the two broadest categories are feed-forward and feed-back networks. A feed-forward network is a non-recurrent network having inputs, outputs, and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feed-back network includes feed-back paths, which means that their signals can travel in both directions using loops. All possible connections between neurons are allowed. Because loops are present in this type of network, under certain operations, it may become a non-linear dynamical system that changes continuously until it reaches a state of equilibrium. Feed-back networks are often used in associative memories and optimization problems, wherein the network looks for the best arrangement of interconnected factors.

In an ANN, a spike generation function may be modeled by a component known generally as a temporal encoder or a spike generator. Thus, the ability to gain greater knowledge of the previously describe biological neural system depends on the development of ANNs that model how neural information is encoded in recurrent networks of spiking temporal encoders. Temporal encoders provide an alternative to both digital and analogue encoding of information by integrating received signals asynchronously and producing subsequent sets of asynchronous pulsed signals. Certain configurations of temporal encoder networks allow for extraction of information about sets of signals input to the network from sets of pulses or spikes output from the network.

SUMMARY

Embodiments are directed to a computer network having pathways. The network includes a plurality of units configured to communicate through the pathways. The network is configured to identify informative looping signals in loops formed from a plurality of network pathways that connect a first one of the plurality of units to a second one of the plurality of units. The network is further configured to apply spike-timing dependent plasticity (STDP) dependent inhibitory gating to the plurality of network pathways. The network is further configured to phase shift open gates and close gates in the loop by applying STDP functions to open gate outputs and closed gates outputs. The network is further configured to make a rate and a direction of the phase shift dependent on a modulatory signal, wherein the modulatory signal is based at least in part on a change in the STDP-dependent inhibitory gating.

Embodiments are further directed to a computer implemented method of implementing a network having pathways. The method includes communicating among a plurality of units through the pathways. The method further includes identifying informative looping signals in loops formed from a plurality of network pathways that connect a first one of the plurality of units to a second one of the plurality of units. The method further includes applying spike-timing dependent plasticity (STDP) dependent inhibitory gating to the plurality of network pathways. The method further includes phase shifting open gates and close gates in the loop by applying STDP functions to open gate outputs and closed gates outputs. The method further includes making a rate and a direction of the phase shift dependent on a modulatory signal, wherein the modulatory signal is based at least in part on a change in the STDP-dependent inhibitory gating.

Embodiments are further directed to a computer program product for implementing a network having pathways. The computer program product includes a computer readable storage medium having program instructions embodied therewith, wherein the computer readable storage medium is not a transitory signal per se. The program instructions are readable by a processor circuit to cause the processor circuit to perform a method. The method includes communicating among a plurality of units through the pathways. The method further includes identifying informative looping signals in loops formed from a plurality of network pathways that connect a first one of the plurality of units to a second one of the plurality of units. The method further includes applying spike-timing dependent plasticity (STDP) dependent inhibitory gating to the plurality of network pathways. The method further includes phase shifting open gates and close gates in the loop by applying STDP functions to open gate outputs and closed gates outputs. The method further includes making a rate and a direction of the phase shift dependent on a modulatory signal, wherein the modulatory signal is based at least in part on a change in the STDP-dependent inhibitory gating.

Embodiments are further directed to a computer implemented method of processing looping signals in a computer network having pathways. The method includes identifying, by processor components of the network, informative looping signals of the computer network, wherein the informative looping signals include spikes having characteristics, and wherein the characteristics of the spikes include states, an order in which spikes traverse the states, and the usefulness of spikes and spike patterns in causing a change to the states which subsequent spikes traverse. The method further includes network using the informative looping signals to control a forward driver gate to either open or close a forward pathway.

Embodiments are further directed to a method of a computer network having pathways. The method includes providing, by a processor of the network, input data to an information maximization network. The method further includes generating spikes in a spike generator as a function of outputs from the information maximization network. The method further includes applying a first spike-timing dependent plasticity (STDP) function to the generated spikes to impact loop topologies of the generated spikes and their pathways. The method further includes calculating spike responses of a forward driver gate to the spike generators, and inhibiting modulators based on the responses of the forward driver gate to the spike generators.

Additional features and advantages are realized through techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 23 depicts a computer program product according to one or more embodiments of the present disclosure.

DETAILED DESCRIPTION

Figure 1:
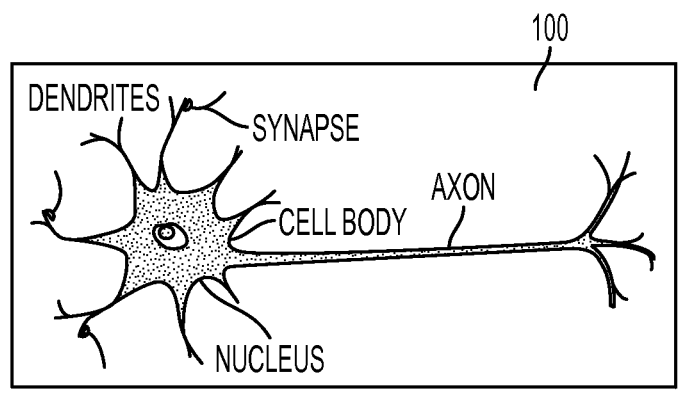
FIG. 1 depicts a sketch of a biological neuron.

It is understood in advance that although this disclosure includes references to modeling biological neural networks with a specific emphasis on modeling brain structures and functions, implementation of the teachings recited herein are not limited to modeling any particular environment. Rather, embodiments of the present disclosure are capable of being implemented in conjunction with any other type of environment, for example, weather patterns, arbitrary data collected from the internet, etcetera, as long as the various inputs to the environment can be turned into a vector.

Although the present disclosure is directed to a computer system architecture, for ease of reference and explanation various aspects of the disclosed computer system architecture are described using neurological terminology such as neurons, synapses, DOPA (dopamine) and GABA (gamma-aminobutyric acid), for example. It will be understood that for any discussion or illustration herein of a computer system architecture, the use of neurological terminology or neurological shorthand notations are for ease of reference and are meant to cover the pulsed neural network equivalents of the described neurological function or neurological component.

As previously noted herein, contemporary temporal encoders provide an alternative to both digital and analogue encoding of information by integrating received signals asynchronously and producing subsequent sets of asynchronous pulsed signals. Certain configurations of temporal encoder networks allow for extraction of information about sets of signals input to the network from sets of pulses or "spikes" output from the network. Information may be extracted from the spiking rates (spikes/sec) of an output temporal encoder, the correlations between spiking rates over the population of temporal encoders, the time intervals between pulses produced by an output temporal encoder or the correlations of patterns of time intervals between pulses produced by a population of output temporal encoders. However, known temporal encoding networks do not disclose how recurrent networks may be configured such that unique looping signals corresponding to useful relationships between features encoded by the network may be identified, selected for persistence, used for a variety of additional network operations, such as transitioning states within the network, then terminated. Furthermore, known temporal encoders do not teach a recurrent network operation in which the selection of output actions is based on input data and selection of looping signals. Furthermore, known temporal encoder networks do not determine whether encoding information in recurrent networks by the selection of looping signals for driving certain output actions based on input data is useful for solving challenging problems in machine learning, such as behavior selection in novelty rich environments. Furthermore, known temporal encoder networks do not teach a preliminary phase of a recurrent network learning, during which the selection of looping signals is for transitioning states of the network while maintaining a diversity of subsequent looping signals and their paths through the network. Furthermore, known temporal encoder networks do not teach the use of external measures of value to augment internal modulatory signals that measure appropriate transitioning of states of the network while maintaining a diversity of subsequent looping signals and their paths through the network. Furthermore, known temporal encoder networks do not teach the use of network categorization of recurrent network states for limiting paths for looping signals and their selection to those paths that are maximally informative about combined measures of external and internal states.

Turning now to an overview of the present disclosure, one or more embodiments are directed to modeling biological neural systems using computer systems that implement a PNN having temporal encoders and informative looping signals. A static network configuration and set of reconfiguration mechanisms capable of discovering, maintaining and terminating informative and useful looping signals within a network of temporal encoders are disclosed. The informative and useful looping signals may be used to maintain short term memory, effect ordered, informative transitions between network states, and stage motor drivers to effect coordinated and useful behaviors in response to information input and encoded by a network configuration referred to herein as an information-based exchange (IBEX) network. The static configuration and reconfiguration mechanisms work together as a generic store for learned transitions and associated useful behaviors in response to specific internal states and input data sets.

Additionally, highly informative looping signals, once identified according to the network mechanisms of the present disclosure, may be used for operations such as short term storage of information in temporarily stable network states, learning useful orderings of transitions between network states, and staging motor drivers to effect coordinated, useful behaviors in response to information encoded in transitioning network states. Furthermore, persistent looping signals traversing informative network features arising as persistent activations of network components allow for relationship information to be rapidly represented and utilized by the network. This relationship information, represented in the unique and ordered traversal of persistent network states by a looping signal such as a spike, allows information encoded by these states to be exploited and augmented in a context specific manner. This process is referred to in the present disclosure as an information-based exchange, hence the use herein of the term information-based exchange (IBEX) network. Spikes traversing unique states in a unique order iteratively aggregate this state and relationship information, as well as information about internal network configuration "choices," such that upon arrival (for example at a set of actuators, or at a gate), spikes carry a large quantity of information. Such spikes are referred to herein as informative looping signals.

In one or more embodiments of the present disclosure, at least one feed-forward information maximizing network of areas is provided. Each area of the information maximizing network comprises a set of units that maximize information about input data comprising an external data source, feed-forward inputs from upstream areas, or both. These areas may be connected sequentially, or in a branching, fan out/fan in, network topology, or in a complex network topology including multiple overlapping feed-forward paths. Each information maximizing unit in an area controls a spike generator that feeds spikes into a behavioral network of temporal encoders.

The spike generator generates spikes at a rate that is some function of the information maximizing unit's response level. Timing of spikes may be random, may encode information about input data, or, when available, may be drawn and relayed from a set of input spike times compiled from both gated forward driver spikes from upstream area spike generators and non-gated feed-back spikes from downstream area spike generators. If more than one feed-forward network is present in a system, they may be concatenated in the feed-forward direction by connections resembling non-gated feed-back, or may be concatenate in the feed-forward direction by certain forward driver gates. The probability of drawing a spike time from this set is weighted by a relay probability specific to each spike generator contributing to a set. Spikes from spike generators are then directed to feed-back connections, a forward driver gate, or both. The forward driver gate, when opened, adds spike times to the set from which its downstream spike generator will determine its own spike times, and additionally merges data about these spikes (such as rate) with the data input to the corresponding information maximizing unit. This unit therefore receives dual feed-forward inputs from upstream areas, namely direct information maximizing unit response levels, and the information about their spiking outputs relayed conditionally through the forward driver gate.

Spike generators implement functions to modify each input spike generator's relay probability. The function operates on input spike/output spike temporal sequences and intervals, and is known as spike-timing dependent plasticity (STDP). Through this function, the network of spike generators formed by positive feed-back connections and positive forward driving inputs favors eliminating short loops and preserving long loops whose period for spike traversal exceeds the STDP functional time window. One loop of particular interest is the grand sensory, limbic motor (SLM) loop connecting a set of feed-forward networks receiving either sensory, limbic, or behavioral input data. This grand loop is completed in the human brain by a dense projection from primary motor to primary somatosensory areas of cortex.

One or more embodiments also include a set of functions implemented by the forward driver gate. Here the function is also STDP, but not loop regulating, because connections through the gate are negative, and thus sustained recurrent looping signals are not possible. Instead, STDP serves to shift the phase of negative (inhibitory) gating spike inputs to the gate relative to a periodic input pattern of positive spike arrival times from various spike generators in the network trying to traverse the gate. The phase shifts are controlled by two types of negative gating spikes, one (direct/dSPN/D1) that produces a pause in a tonic closed signal from GPi (gate open), and another (indirect/iSPN/D2) that produces an increase to the tonic closed signal from GPi (via a pause in a tonic negative signal in GPe, i.e., gate closed).

The independent control of negative gating open and closed phases is controlled as follows by the two above-described pathways. Subject to an additional modulator (e.g., DOPA) and a local competition (e.g., GABA), phase shifts for "local winner" units in the presence of the modulator are established. It is noted that competition is determined by lateral inhibition between units and is known in the art, such as in a Kohonen network. Phase shifts are advancing for dSPN units and constant for iSPN units, effectively separating the gate open and gate closed windows in time, and ensuring the gating window remains open when activated. When the modulator is withdrawn, the dSPN phase remains constant, whereas the iSPN phase is advanced. In this way, the "gate closed" window advances to occlude the "gate open" window and the looping signal is terminated. For "losers" of the local competition in the presence of the modulator, phase shifts are delaying for both dSPN and iSPN. In the absence of the modulator, phase shifts for all "losers" are zero. It is noted that the concepts of "competition," "winners," and "losers" are used herein as one embodiment of the disclosed network. Other "winnerless" spiking networks described in the art may also be used, wherein the relative level of inhibition can still provide the necessary modulation categories for determining phase shifts and their direction. Furthermore, patterns of lateral connections need not follow those of a Kohonen network, and, for example, may be sparse.

Finally, the source of modulatory input to forward gating STDP is disclosed. This modulatory input is driven positively, and infrequently, by external measures of value. In the closed loop system of the present disclosure, the drivers are negative from large populations of dSPN and iSPN spikes. When this inhibition is relieved, the modulator signal is present and strong (i.e., rebound spiking). This biases the system to gating functions that maximize the entropy of dSPN and iSPN spiking activity over time (i.e., maximize rapid orthogonal shifts in their gating vectors), as well as the entropy of the transitions between grand loops dSPN and iSPN controls via their gating functions. The controls on rebound from inhibition (e.g., integration times of activation, inactivation, unit compartmentalization, etc.) further biases the system to gating functions that change their gating vectors at particular intervals (e.g., every several hundred milliseconds) corresponding to the temporal constraints imposed by these controls. Thus, the present disclosure is directed to modeling biological neural systems using computer systems that implement a type of pulsed artificial neural network referred to in the present disclosure as an information-based exchange (IBEX) network having temporal encoders and informative looping signals.

Accordingly, the present disclosure provides technical benefits, including but not limited to that one or more embodiments of the present disclosure do not require imposed value functions for closed loop functions. Additionally, relatively fast learning results are obtained from loop propagation and discovery of gating functions that maximize entropy and diversity of all traversals across information maximizing areas. Behaviors and network dynamics are deployed as a coding scheme and as a means to measure usefulness of codes. Categories emerge through unsupervised learning of high entropy loop traversals that terminate other loops (i.e., elimination of threats). Open loop control problems are mapped to an internal set of closed loop selection mechanisms. State estimator components are more robust and undergo rapid reorganization when conditions for loop selection change. Multiple latencies for behavior initiation and termination are available because of the extremely large number of looping states and the availability of certain states that do not evoke an external behavior, but only serve to constrain state transitions towards certain behavioral outcomes and not others.

As context for one or more of the embodiments disclosed herein, an overview of biological neural networks will now be provided. FIG. 1 depicts a sketch of a biological neuron 100. Neuron 100, also known as a nerve cell, is a special biological cell that processes information. As shown, it is composed of a cell body, or soma, and two types of outward reaching, tree-like branches, namely, the axon and the dendrites. The cell body has a nucleus that contains information about hereditary traits and a cytosol that holds the molecular equipment for producing material needed by the neuron. A neuron receives signals (impulses) from other neurons through its dendrites (receivers) and transmits signals generated by its cell body along the axon (transmitter), which eventually branches into strands and sub-strands. At the terminals of these strands are the synapses. A synapse is an elementary structure and functional unit between two neurons (an axon strand of one neuron and a dendrite of another). When the impulse reaches the synapse's terminal, certain chemicals called neurotransmitters are released. The neurotransmitters diffuse across the synaptic gap, to enhance or inhibit, depending on the type of the synapse, the receptor neuron's own tendency to emit electrical impulses. The synapse's efficacy can be adjusted by the signals passing through it so that synapses can learn from the histories of activities in which they participate. This dependence on history acts as a memory, which is possibly responsible for human memory.

Figure 2:
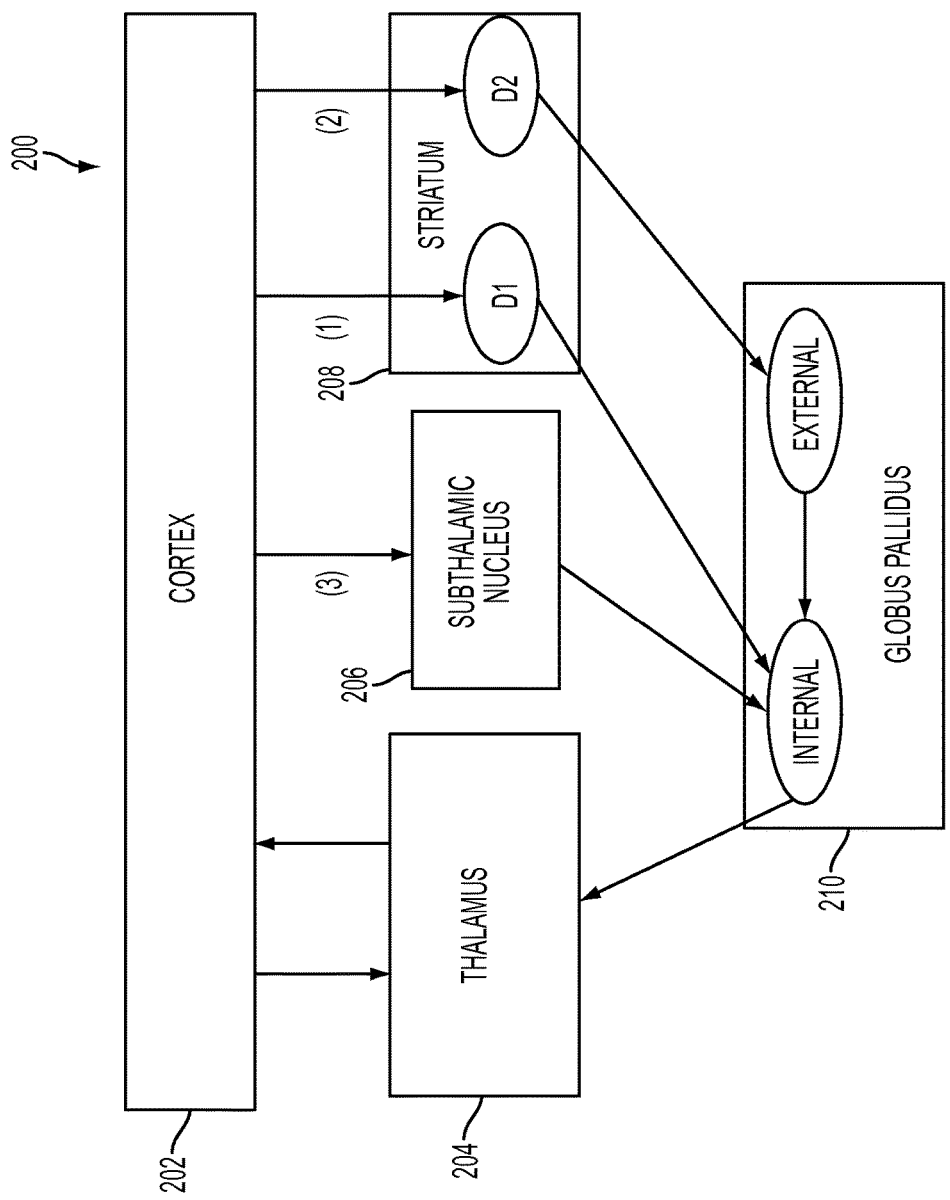
FIG. 2 depicts a block diagram representing part of the structure of a human brain.

FIG. 2 depicts a block diagram representing part of the structure of a human brain 200. Brain 200 includes a cerebral cortex 202, a thalamus 204, a subthalamic nucleus 206, a striatum 208 and a globus pallidus 210, configured and arranged as shown. A more complete description of FIG. 2 is provided a publication written by Sebastien Helie, Srinivasa Chakravarthy and Ahmed A. Moustafa, titled "Exploring The Cognitive and Motor Functions of The Basal Ganglia: An Integrative Review of Computational Cognitive Neuroscience Models," published in Frontiers In Computational Neuroscience, December 2013, the entire disclosure of which is incorporated by reference herein. For purposes of the current description, cerebral cortex 202 in humans is a large flat sheet of neurons about 3 to 4 millimeters thick with a surface area of about 2,200 $cm^2$, which is about twice the area of a standard computer keyboard. Cerebral cortex 202 contains about $10^{11}$ neurons, which is approximately the number of stars in the Milky Way. Neurons are massively connected, and, in comparison, the networks they form are much more complex and dense than telephone networks. Each neuron is connected to from $10^3$ to $10^4$ other neurons. In total, human brain 200 contains approximately from $10^{14}$ to $10^{15}$ interconnections (not shown). Neurons (e.g., neuron 100 shown in FIG. 1) within cerebral cortex 202 communicate through a very short train of pulses, typically milliseconds in duration. The message is modulated on the pulse-transmission frequency. This frequency can vary from a few to several hundred hertz, which is, by comparison, a million times slower than the fastest switching speed in electronic circuits. However, complex perceptual decisions such as face recognition are typically made by humans within a few hundred milliseconds. These decisions are made by a network of neurons whose operational speed is only a few milliseconds. This implies that the computations cannot take more than about 100 serial stages. In other words, human brain 200 runs parallel programs that are about 100 steps long for such perceptual tasks. This is known as the hundred step rule. The same timing considerations show that the amount of information sent from one neuron to another must be very small (a few bits). This implies that critical information is not transmitted directly, but captured and distributed in the interconnections. Additional details about biological neurons and biological neural networks are available from a publication by S. Brunak and B. Lautrup, titled Neural Networks, Computers with Intuition, published in World Scientific, Singapore (1990), the entire disclosure of which is incorporated by reference herein.

As additional context for one or more of the embodiments disclosed herein, an overview of ANNs will now be provided. ANNs can be viewed as weighted directed graphs in which artificial neurons are nodes, and directed edges (with weights) are connections between neuron outputs and neuron inputs. Based on the connection pattern (i.e., architecture), ANNs may be grouped into two categories, namely, feed-forward networks in which graphs have no loops, and feed-back or recurrent networks in which loops occur because of feed-back connections. In the most common family of feed-forward networks, known generally as multilayer perceptron networks, neurons are organized into layers that have unidirectional connections between them.

Different connectivity in ANNs yields different network behaviors. In general, feed-forward networks are static. In other words, they produce only one set of output values rather than a sequence of values from a given input. Feed-forward network dynamics are memory-less in the sense that their response to an input is independent of the previous network state (though their weights may hold history-dependent state). By contrast, feed-back or recurrent networks are dynamic systems. When a new input pattern is presented, the neuron outputs are computed. Because of the feed-back paths, the inputs to each neuron are then modified, which leads the network to enter a new state.

Different network architectures require appropriate learning algorithms. The ability to learn is a fundamental trait of intelligence. Although a precise definition of learning is difficult to formulate, a learning process in the ANN context can be viewed as the problem of updating network architecture and connection weights so that a network can efficiently perform a specific task. The network usually must learn the connection weights from available training patterns. Performance is improved over time by iteratively updating the weights in the network. An ANNs' ability to automatically learn from examples makes it an attractive design option. Instead of following a set of rules specified by human experts, ANNs appear to learn underlying rules (like input-output relationships) from the given collection of representative examples. This is one of the major advantages of ANNs over traditional expert systems.

In order to understand or design a learning process, it is necessary to have a model of the environment in which a neural network operates. In other words, the information that is available to the network must be known. This model may be referred to as a learning paradigm. Additionally, it must be understood how network weights are updated. In other words, the learning rules that govern the updating process must be understood. A learning algorithm refers to a procedure in which learning rules are used for adjusting the weights. There are three main learning paradigms: supervised, unsupervised, and hybrid. In supervised learning, or learning with a "teacher," the network is provided with a correct answer (output) for every input pattern. Weights are determined to allow the network to produce answers as close as possible to the known correct answers. Reinforcement learning is a variant of supervised learning in which the network is provided with only a critique on the correctness of network outputs, not the correct answers themselves. In contrast, unsupervised learning, or learning without a teacher, does not require a correct answer associated with each input pattern in the training data set. It explores the underlying structure in the data, or correlations between patterns in the data, and organizes patterns into categories from these correlations. Hybrid learning combines supervised and unsupervised learning. Parts of the weights are usually determined through supervised learning, while the others are obtained through unsupervised learning. Additional details of ANNs and learning rules are described in Artificial Neural Networks: A Tutorial, by Anil K. Jain, Jianchang Mao and K. M. Mohiuddin, IEEE, March 1996, the entire disclosure of which is incorporated by reference herein.

Figure 3:
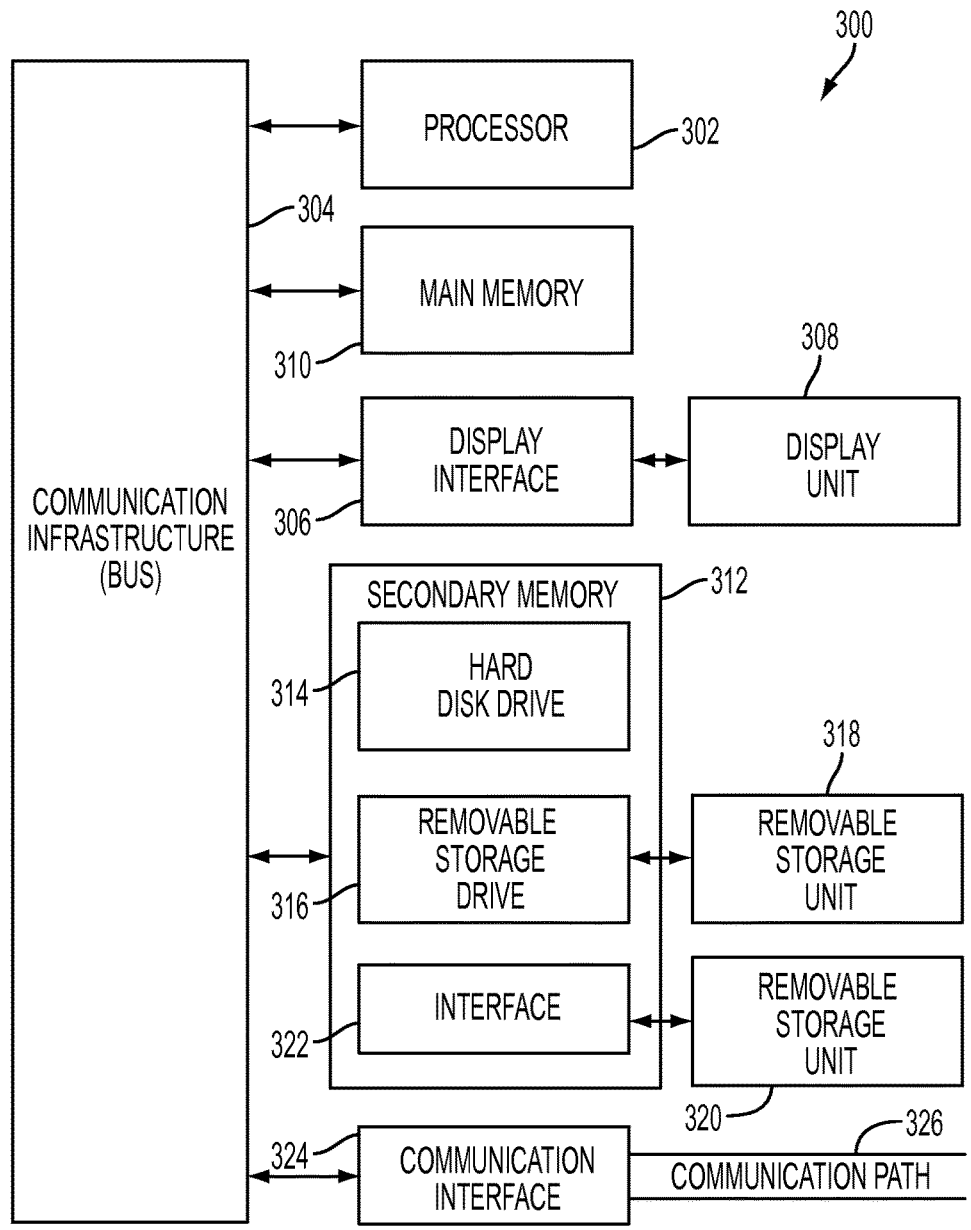
FIG. 3 depicts an exemplary computer system capable of implementing one or more embodiments of the present disclosure.

Turning now to the drawings in greater detail, wherein like reference numerals indicate like elements, FIG. 3 illustrates a high level block diagram showing an example of a computer-based information processing system 300 useful for implementing one or more embodiments of the present disclosure. Although one exemplary computer system 300 is shown, computer system 300 includes a communication path 326, which connects computer system 300 to additional systems (not depicted) and may include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In alternative embodiments, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310 and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
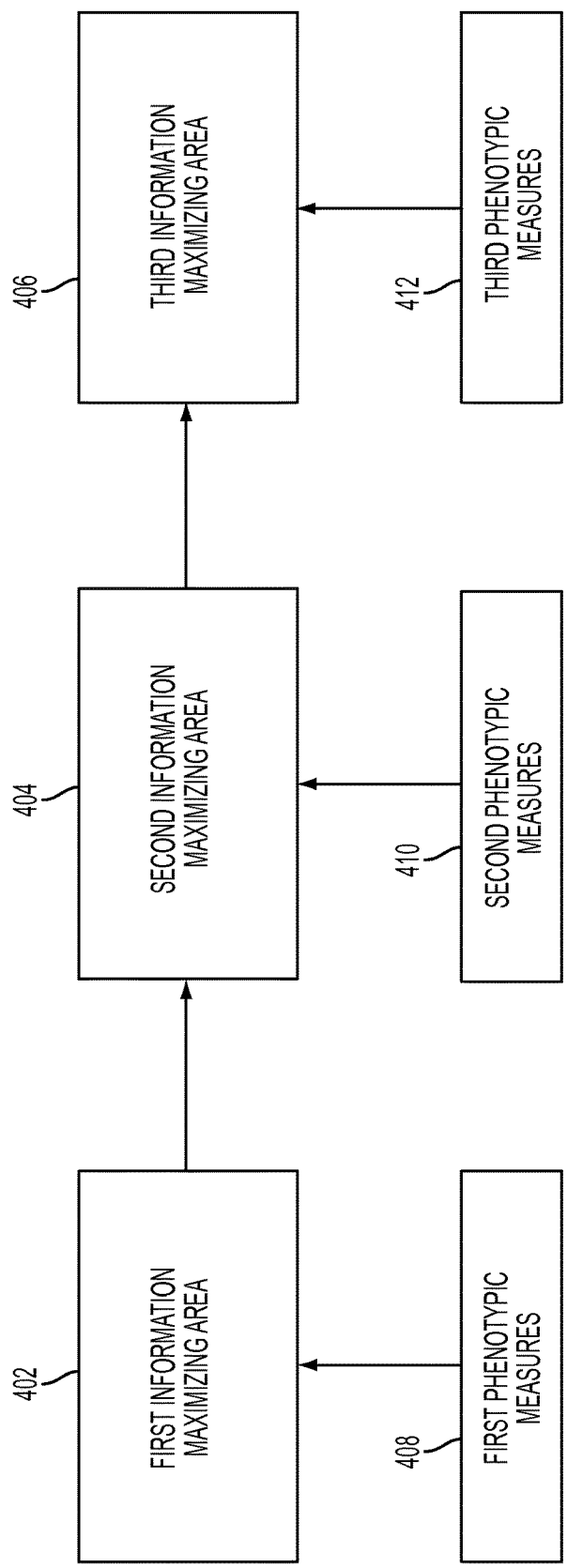
FIG. 4 depicts a block diagram illustrating a configuration of information maximizing areas capable of being utilized by one or more embodiments of the present disclosure.
Figure 5:
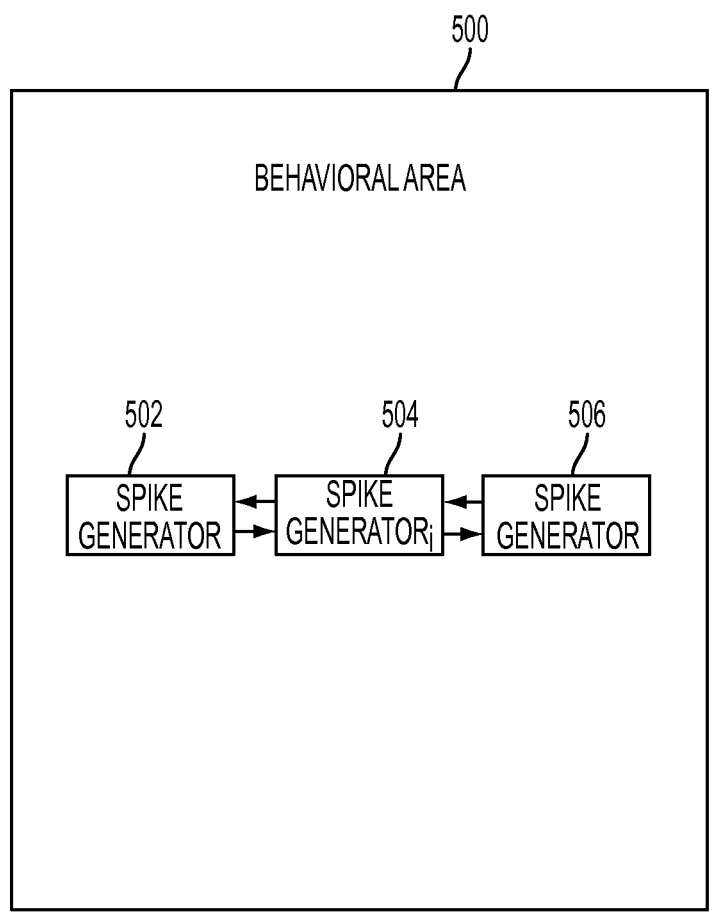
FIG. 5 depicts details of a block diagram of a behavioral area capable of being utilized by one or more embodiments of the present disclosure.

Turning now to a more detailed description of one or more embodiments of the present disclosure, FIGS. 4 and 5 illustrate how cortex 202 (shown in FIG. 2) of human brain 200 (also shown in FIG. 2) may be characterized by two different types of areas, namely information maximizing areas (IMAs) and behavioral areas (BAs). More specifically, FIG. 4 depicts a block diagram illustrating a configuration of IMAs, and FIG. 5 illustrates an example of a BA. The IMAs of FIG. 4 and the BA of FIG. 5 are capable of being utilized by one or more embodiments of the present disclosure.

The block diagram of FIG. 4 illustrates a first IMA 402, a second IMA 404, a third IMA 406, a first phenotypic measure 408, a second phenotypic area 410 and a third phenotypic area 412, configured and arranged as shown. Input vectors are provided to the IMAs 402, 404, 406 via phenotypic measures 408, 410, 412. Phenotypic measures refer to measurements taken by the various sensory receptors of the body, including, for example, the retina, skin receptors, interior receptors of the gut, skeletal stretch receptors in the muscles, receptors at the joints, taste buds and temperature sensors in the skin. IMAs 402, 404, 406 operate under the principles of information maximization. Information maximization takes a set of inputs and maps them to a useful set of outputs. Information maximization is also known as feature identification, or basic neural network categorization. The use of the term "information maximization" herein refers to the general tendency of an IMA towards increasing information in some output vector ensemble over some input vector ensemble, and it does not imply that some optimum maximum information is ever achieved by a network at any specific time in a network's operation. Categories of input vectors are self organized using unsupervised learning, wherein the objective that information maximization is attempting to satisfy is maximum entropy or maximum information. In other words, information maximization attempts to afford maximum coverage of some output space by an output vector ensemble given some input vector ensemble. For example, for input vectors that are bunched together such that there is heavy representation in one area of the input space, information maximization takes the bunched input vectors and spreads them out over the output space. The effect is that an analysis of the input vectors can be much more detailed because a larger region of the output space encodes for the input vectors. Thus, IMAs 402, 404, 406 correspond to a component or a structure in a model/architecture of the present disclosure, which is referred to herein as an area. The number of inputs and the number of outputs for an area can be arbitrary, so an area generally represents a plurality of units that cooperate to maximize information.

The block diagram of FIG. 5 illustrates an example of a BA 500 having spike generators 502, 504, 506, configured and arranged as shown. Spike generators 502, 504, 506 operate according to spike generation principles, wherein a scalar (e.g., from zero to one) is transformed into a series of time events. The time or the frequency of the event is a reflection of the scalar value (i.e., a value having magnitude but not direction). Accordingly, if an element of "u" is a scalar with a value between zero and one, spike generators 502, 504, 506 will generate spikes at a rate which is some function of the element of "u."

Because BA 500 is spike generating, it may be represented as a temporal encoder. As previously noted, contemporary temporal encoders provide an alternative to both digital and analogue encoding of information by integrating received signals asynchronously and producing subsequent sets of asynchronous pulsed signals. Certain configurations of temporal encoder networks allow for extraction of information about sets of signals input to the network from sets of pulses or "spikes" output from the network. Information may be extracted from the spiking rates (spikes/sec) of an output temporal encoder, the correlations between spiking rates over the population of temporal encoders, the time intervals between pulses produced by an output temporal encoder or the correlations of patterns of time intervals between pulses produced by a population of output temporal encoders. However, known temporal encoding networks, implemented without benefit of the present disclosure, do not disclose how recurrent networks may be configured such that unique looping signals corresponding to useful relationships between features encoded by the network may be identified, selected for persistence, used for a variety of additional network operations, then terminated. Furthermore, known temporal encoders do not teach a recurrent network operation in which the selection of output actions is based on input data and selection of looping signals. Additionally, known temporal encoder networks do not determine whether encoding information in recurrent networks by the selection of looping signals for driving certain output actions based on input data is useful for solving challenging problems in machine learning, such as behavior selection in novelty rich environments. Furthermore, known temporal encoder networks do not teach a preliminary phase of a recurrent network learning, during which the selection of looping signals is for transitioning states of the network while maintaining a diversity of subsequent looping signals and their paths through the network. Furthermore, known temporal encoder networks do not teach the use of external measures of value to augment internal modulatory signals that measure appropriate transitioning of states of the network while maintaining a diversity of subsequent looping signals and their paths through the network. Furthermore, known temporal encoder networks do not teach the use of network categorization of recurrent network states for limiting paths for looping signals and their selection to those paths that are maximally informative about combined measures of external and internal states.

Figure 6A:
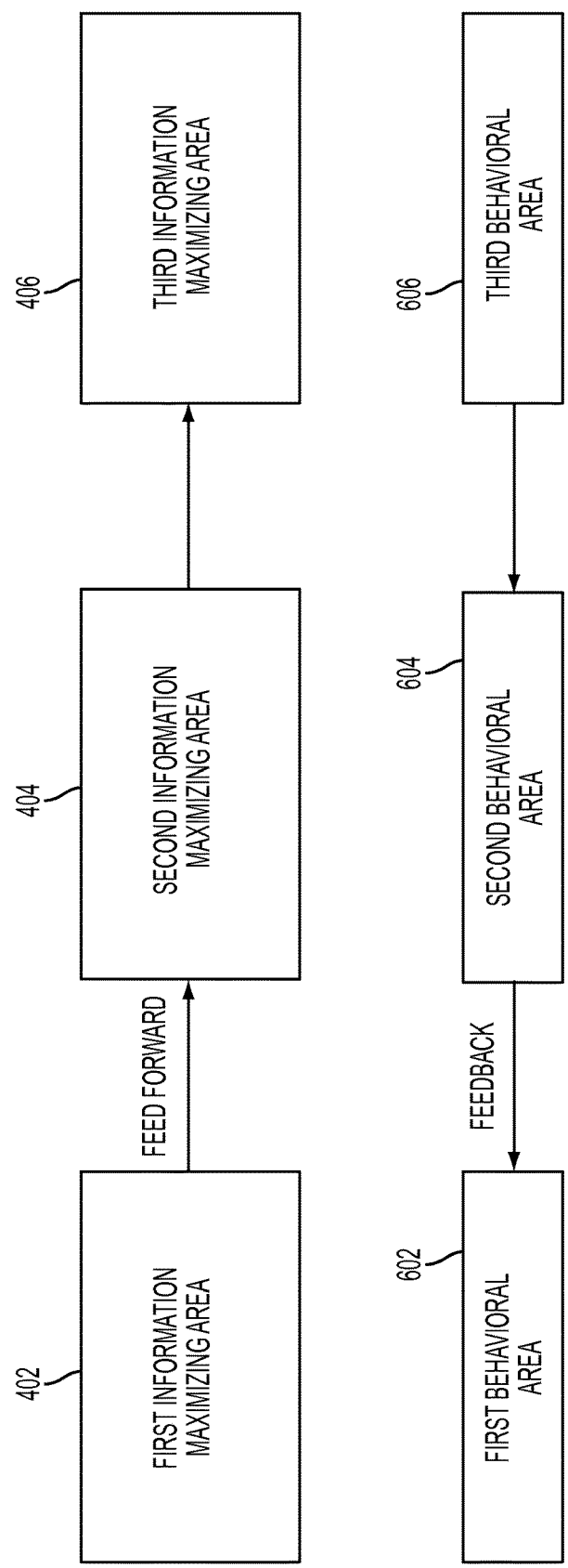
FIG. 6A depicts a block diagram illustrating a configuration of information maximizing areas and behavioral areas capable of being utilized by one or more embodiments of the present disclosure.
Figure 6B:
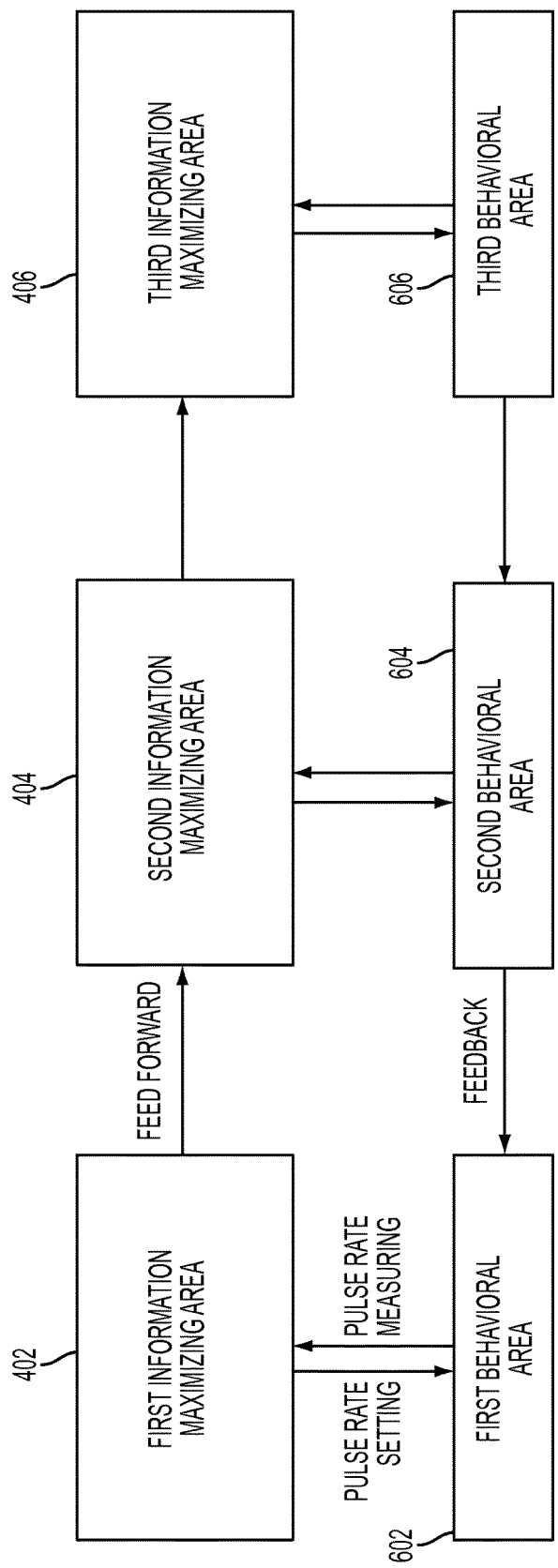
FIG. 6B depicts a block diagram illustrating another configuration of information maximizing areas and behavioral areas capable of being utilized by one or more embodiments of the present disclosure.

FIGS. 6A and 6B depict block diagrams illustrating a configuration of IMAs and BAs capable of being utilized by one or more embodiments of the present disclosure. More specifically, FIGS. 6A and 6B depict IMAs 402, 404, 406 and BAs 602, 604, 606, configured and arranged as shown. Referring specifically to FIG. 6A, IMAs 402, 404, 406 receive input vectors from phenotypic measures 408, 410, 412 (shown in FIG. 4). Additionally, IMAs 404, 406 receive input measures from a preceding or upstream IMA. Mapping the configuration of FIGS. 6A and 6B to human brain 200 shown in FIG. 2, IMAs 402, 404, 406 are in one portion of cortex 202 (e.g., layer ⅔ of different Brodmann areas of cortex). Deeper (e.g., 2 to 4 millimeters) into cortex 202 are BAs 602, 604, 606 (e.g., layer 5 of corresponding Brodmann areas of cortex).

IMAs 402, 404, 406 are cascaded in a feed-forward direction, and BAs are cascaded in a feed-back direction. As previously noted herein, a feed-forward connection is a non-recurrent connection in which signals can only travel in a direction identified as forward. Input data is passed onto an area of processing elements where it performs calculations. Each processing element makes its computation, and the new calculated values become the new input values that feed the next area. This process continues until it has gone through all the layers and determines the output. In contrast, feed-back connections can travel in a direction identified as back, which is a direction different from the forward direction. Because loops are present in feed-back connections, they become a non-linear dynamical system that changes continuously until, given constant input and an appropriate network configuration, it reaches a state of equilibrium.

In FIG. 6B, BAs 602, 604, 606 are registered one-to-one with IMAs 402, 404, 406. The registration between IMAs and BAs is represented by directional arrows extending from an IMA to a BA, and from a BA to an IMA. The registrations are identified as "pulse rate setting" from IMA to BA, and "pulse rate measuring" from BA to IMA. The directional arrows between IMAs 402, 404, 406 and BAs 602, 604, 606 correspond to columns in cortex 202 (shown in FIG. 2) that extend between various portions (e.g., IMA 402 and BA 602) of cortex 202. Thus, in the system architecture of one or more embodiments, the rate or specific timing of spikes generated by the BA is both modulated and/or set by the IMA. The IMA sets the pulse rate, or modulates the pulse rate, and the IMA measures the pulse rate in order to come up with a scalar representation of that pulse rate.

Figure 7A:
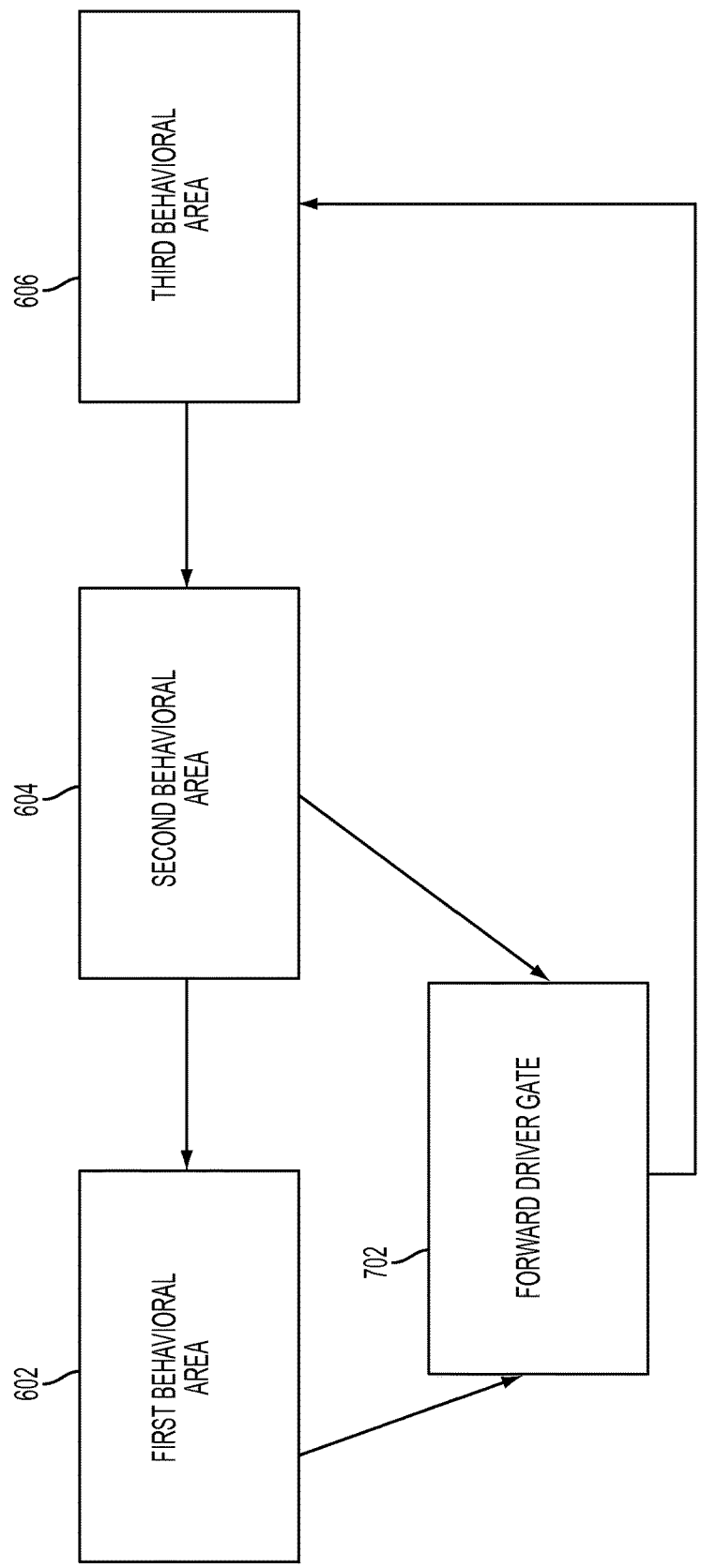
FIG. 7A depicts a block diagram illustrating a configuration of behavioral areas and a forward driver gate capable of being utilized by one or more embodiments of the present disclosure.

As previously noted, BAs 602, 604, 606 are spike generating (as illustrated by BA 500 in FIG. 5). Under the configurations shown in FIGS. 6A and 6B, there is no path for spikes generated in BAs 602, 604, 606 to propagate in the feed-forward direction. Accordingly, FIG. 7A depicts a block diagram in which BAs 602, 604, 606 and a forward driver gate (FDG) 702, configured and arranged as shown, provide a path for spikes generated in BAs 602, 604, 606 to propagate in the feed-forward direction through FDG 702 in accordance with one or more embodiments of the present disclosure. FDG 702 could gate either a many-to-one, one-to-one, many-to-many or one-to-many relationships between upstream (e.g., BA 602 or BA 604) and downstream (e.g., BA 606) BAs. In the example shown in FIG. 7A, as well as the example shown in FIG. 7B, FDG 702 gates a many-to-one relationship between BAs 602, 604 and BA 606 in the feed-forward direction. FDG 702 receives inputs from BA 602 and BA 604 and decides whether or not to open and let those inputs flow to BA 606.

Figure 7B:
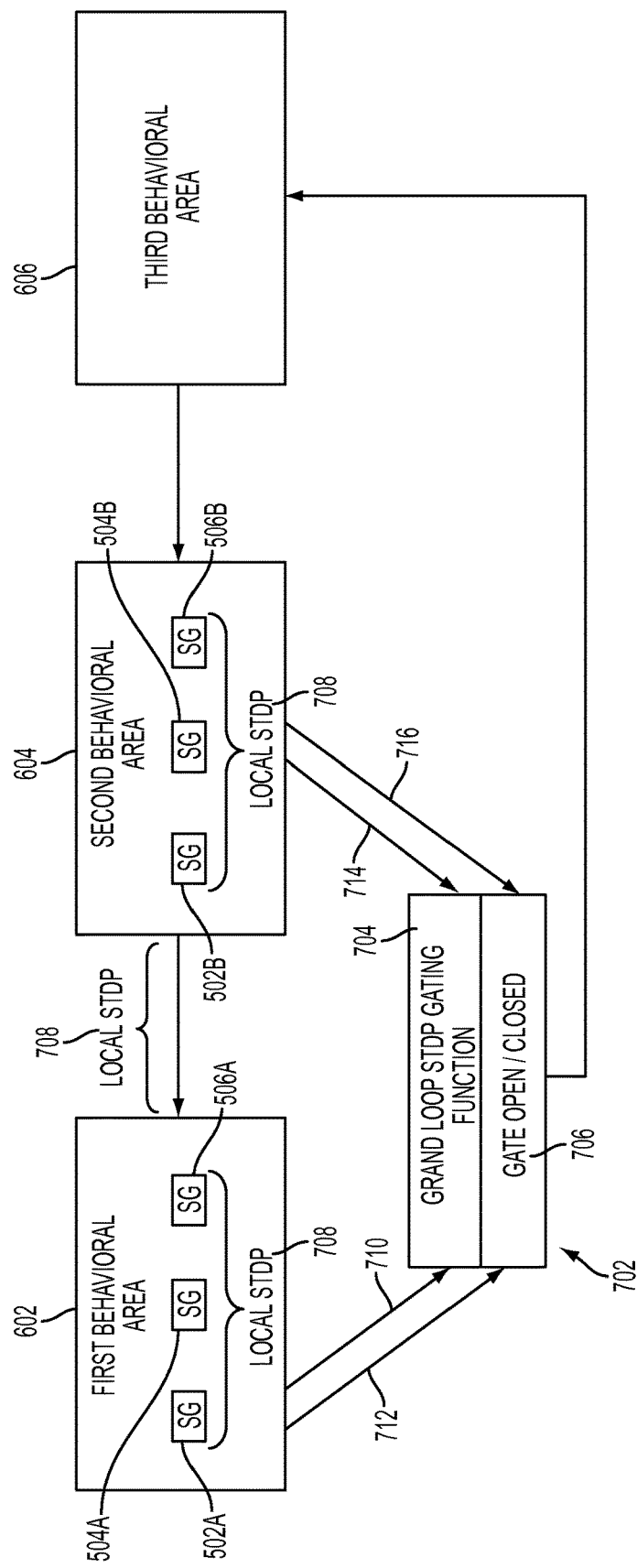
FIG. 7B depicts a block diagram illustrating another configuration of behavioral areas and a forward driver gate capable of being utilized by one or more embodiments of the present disclosure.

FIG. 7B is a more detailed diagram of the configuration shown in FIG. 7A, wherein FDG 702 includes a gate 706 and a grand loop STDP gating function 704, and wherein a local STDP function 708 is applied to spike generators (SGs) 502A, 504A, 506A and feed-back connections between BAs 602, 604, 606. In effect, local STDP gating function 708 and grand loop gating function 704 both apply STDP functionality, however each application of STDP is being used to obtain different results. Local STDP function 708 is applied within and between BAs 602, 604, 606 in order to eliminate local (i.e., relatively shorter) loops within and between BAs 602, 604, 606. Because STDP depends on pulse timing, and because FDG 702 takes inputs that are timed and pulsed, grand loop STDP function 704 is applied between inputs to FDG 702 and gate 706 to determine whether or not to open or close FDG 702. Thus, units in BAs 602, 604, 606 will only be connected through grand loop pathways and not through local loop pathways because local loops are effectively precluded by the application of local STDP function 708. Note that grand loop pathways can involve signals traversing feed-back and feed-forward connections between separate units in BAs 602, 604, 606, but that local looping signals between units are largely precluded. Accordingly, there are two inputs 710, 712 from BA 602 into FDG 702, as well as two inputs 714, 716 from BA 604 into FDG 702. Inputs 710, 714 are attempting to access grand loop STDP gating function 704, which is learning which paths through gate 706 to open and close based on any given set of inputs. Once gate 706 is open or closed, inputs 712, 716 from either BA 602 or 604 directly to gate 706 are influenced in terms of their ability to traverse gate 706 and reach BA 606.

Thus, FDG 702 uses STDP gating function 704 to open and close gate 706 through learning. Grand loop STDP gating function 704 shifts the phase of negative (inhibitory) gating spike inputs to 706 relative to a periodic input pattern of positive spike arrival times from various spike generators 502A, 504A, 506A, 502B, 504B, 506B trying to traverse gate 706. The phase shifts are controlled by two types of negative gating spikes, one (direct/dSPN/D1) that produces a pause in a tonic closed signal from GPi (gate open), and another (indirect/iSPN/D2) that produces an increase to the tonic closed signal from GPi (via a pause in a tonic negative signal in GPe; gate closed). Independent control of negative gating open and closed phases is controlled by these two pathways as described in the next paragraph.

Subject to an additional modulator (e.g., DOPA) and a local competition (e.g., GABA), phase shifts for "local winner" units in the presence of the modulator are now described. It is noted that competition is determined by lateral inhibition between units and is known in the art, such as in a Kohonen network. Phase shifts are advancing for dSPN units and constant for iSPN units, effectively separating the gate open and gate closed windows in time, and ensuring the gating window remains open when activated. When the modulator is withdrawn, the dSPN phase remains constant, whereas the iSPN phase is advanced. In this way, the "gate closed" window advances to occlude the "gate open" window and the looping signal is terminated. For "losers" of the local competition in the presence of the modulator, phase shifts are delaying for both dSPN and iSPN. In the absence of the modulator, phase shifts for all "losers" are zero. It is noted that the concepts of "competition," "winners," and "losers" are used herein as one embodiment of the network. Other "winnerless" spiking networks described in the art may also be used, wherein the relative level of inhibition can still provide the necessary modulation categories for determining phase shifts and their direction. Furthermore, patterns of lateral connections need not follow those of a Kohonen network, and, for example, may be sparse.

The modulatory input to forward gating STDP driven positively, and infrequently, by external measures of value. In the closed loop system of the present disclosure, the drivers are negative from large populations of dSPN and iSPN spikes. When this inhibition is relieved, the modulator signal is present and strong (rebound spiking). This biases the system to gating functions that maximize the entropy of dSPN and iSPN spiking activity over time (i.e., maximize rapid orthogonal shifts in their gating vectors), as well as the entropy of the transitions between grand loops dSPN and iSPN controls via their gating functions. The controls on rebound from inhibition (e.g., integration times of activation, inactivation, unit compartmentalization, etc.) further biases the system to gating functions that change their gating vectors at particular intervals (e.g., every several hundred milliseconds) corresponding to the temporal constraints imposed by these controls.

FIGS. 8-11 depict flow diagrams illustrating methodologies 800, 900, 1000, 1100 according to one or more embodiments of the present disclosure. It should be noted that, although the operations shown in methodologies 800, 900, 1000, 1100 are listed in a sequence, the blocks that make up methodologies 800, 900, 1000, 1100 are not necessarily limited to a performance of the listed operations in any particular order.

Figure 8:
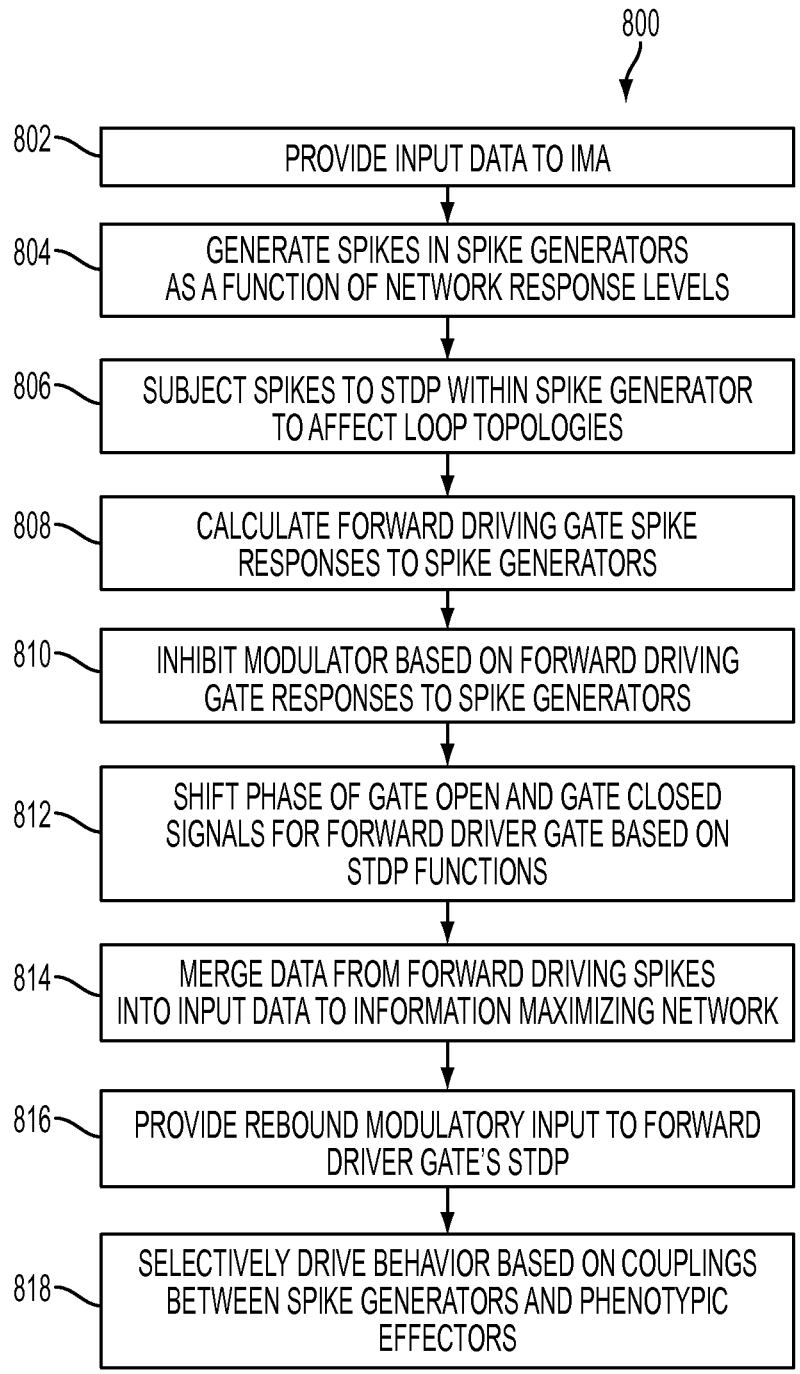
FIG. 8 depicts a flow diagram illustrating a methodology according to one or more embodiments of the present disclosure.

FIG. 8 depicts a methodology 800 embodying an overall operation of a network architecture in accordance with the present disclosure. As shown in FIG. 8, methodology 800 begins at block 802 by providing input data to an IMA. In block 804, spikes are generated as a function of network response levels. Block 806 subjects spikes to a local STDP function to affect loop topologies. Block 808 calculates FDG spike responses to spike generators. In block 810, inhibition and modulation are implemented based on FDG responses to spike generation. In block 812, phase is shifted for gate open and gate closed signals for the FDG based on a grand loop STDP function. In block 814, data from forward driving spikes are merged into data that is input to an IMA. Block 816 provides a rebound modulatory input to the grand loop STDP function of a FDG. In block 818, behavior can now be selectively driven based on couplings between spike generators and phenotypic effectors. It is noted that phenotypic effectors, while external to the network describe herein, may themselves reside in part of a human brain, such as in a brain stem neuromodulatory nucleus.

Figure 9:
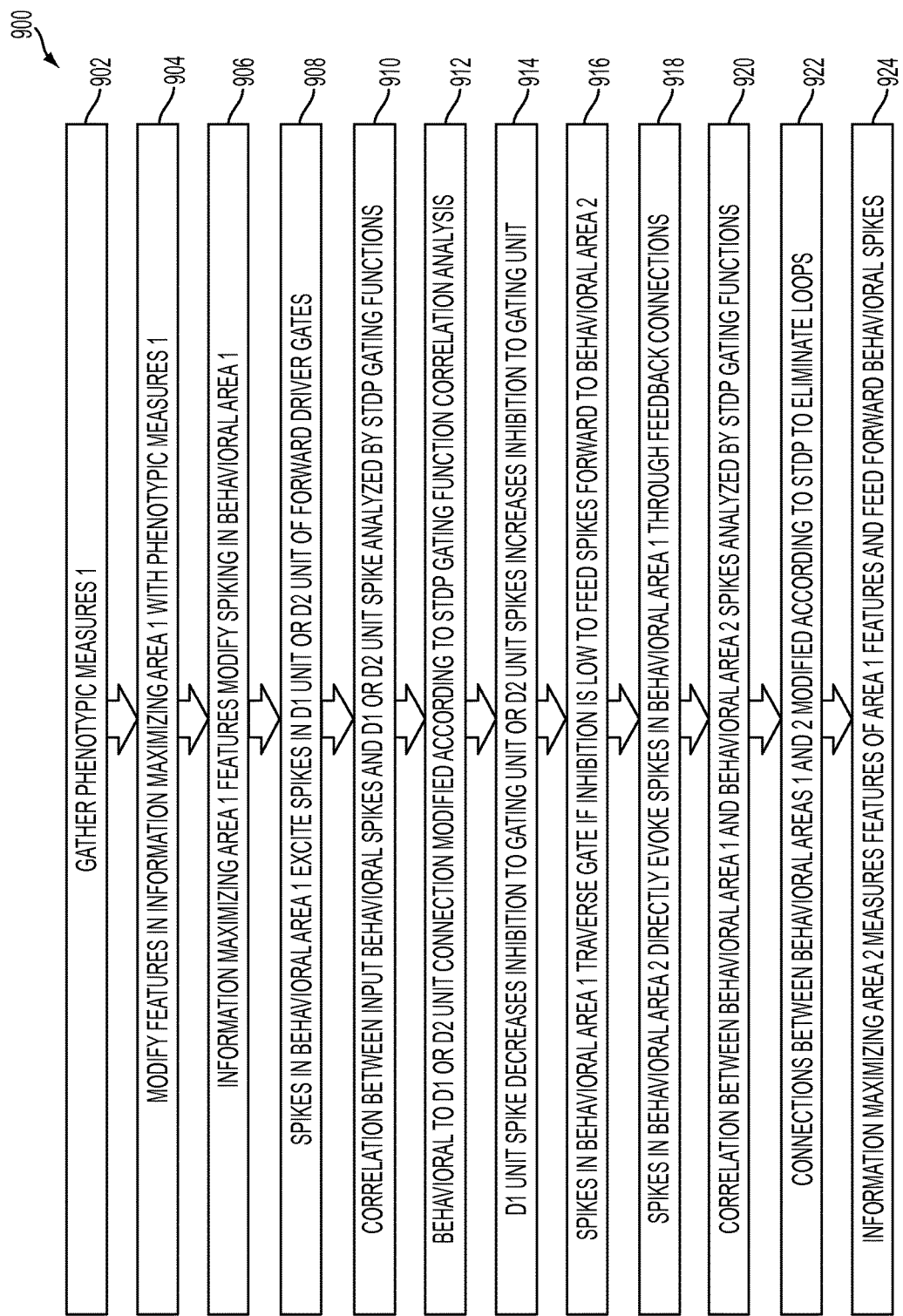
FIG. 9 depicts a flow diagram illustrating another methodology according to one or more embodiments of the present disclosure.
Figure 10:
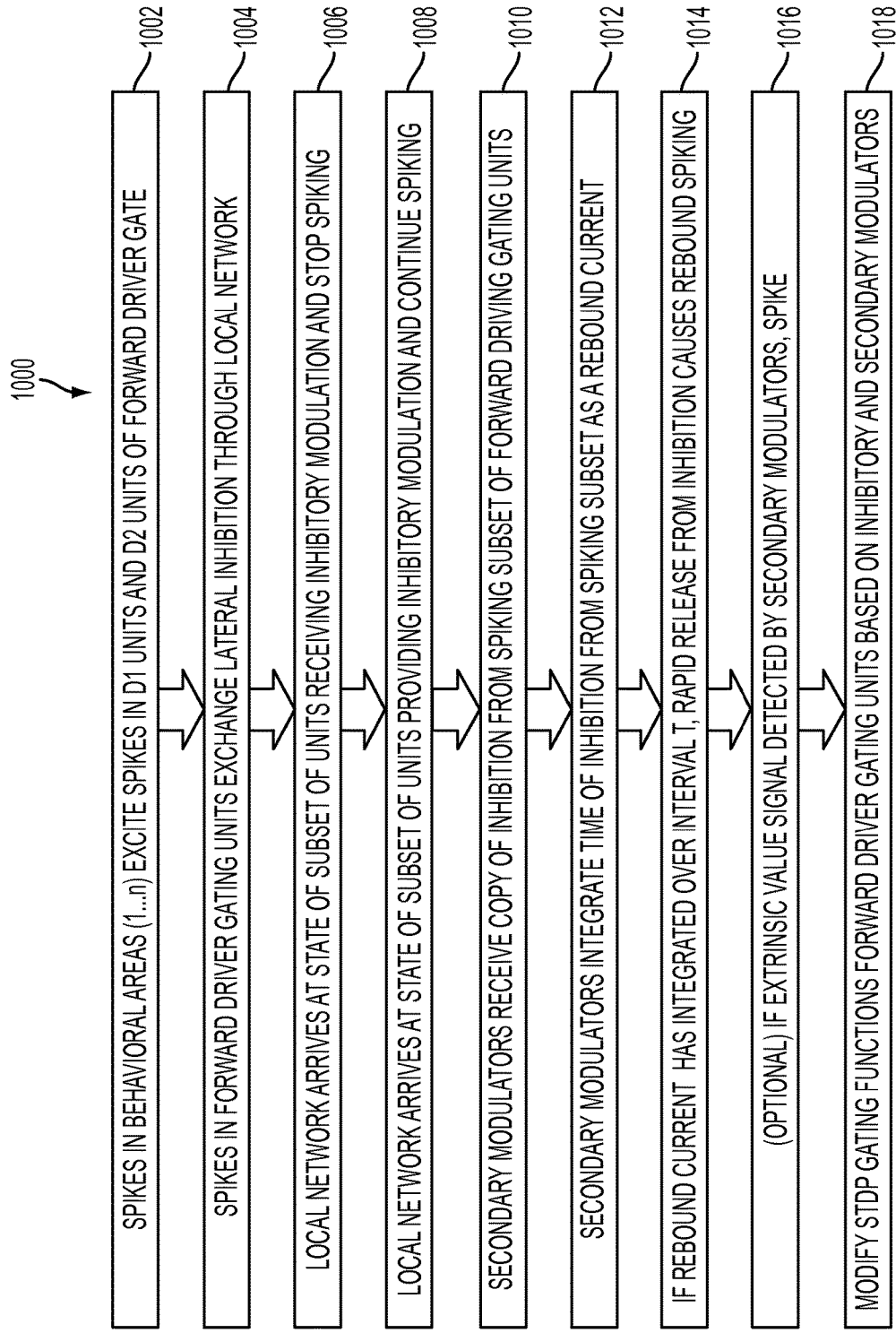
FIG. 10 depicts a flow diagram illustrating another methodology according to one or more embodiments of the present disclosure.
Figure 11:
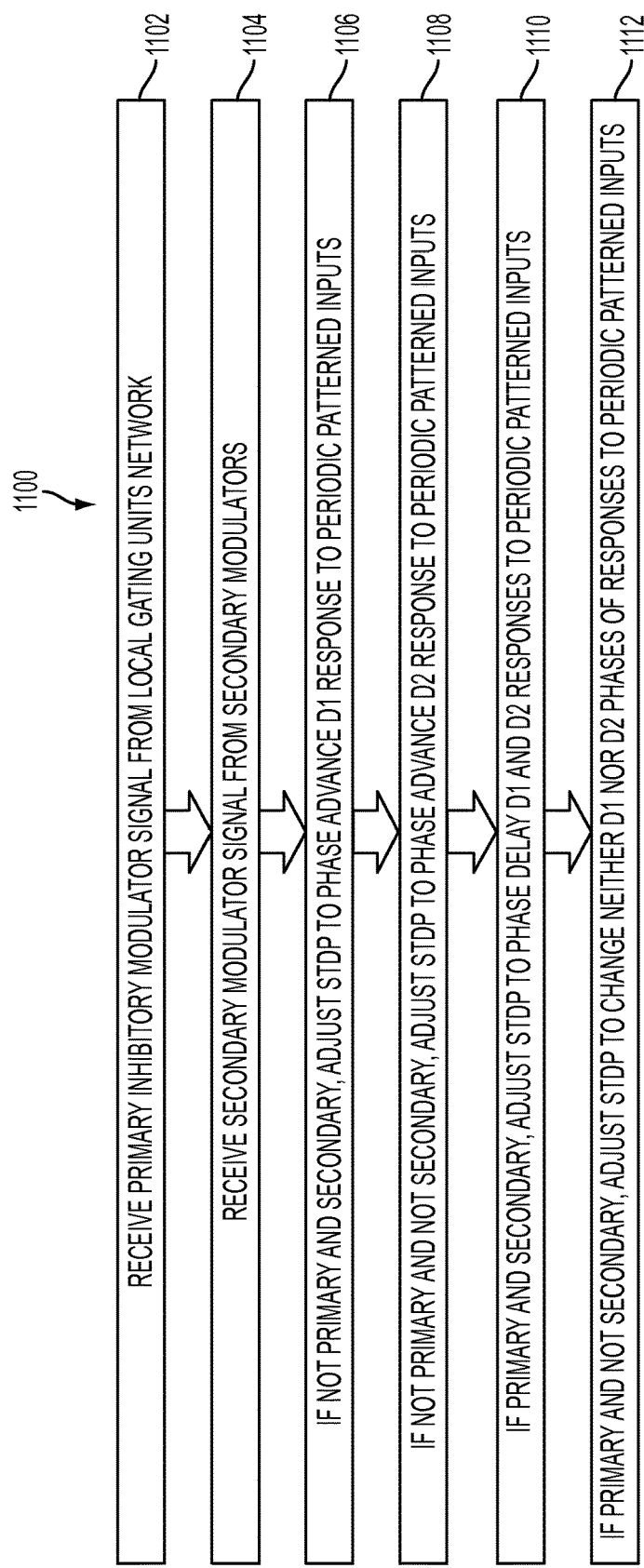
FIG. 11 depicts a flow diagram illustrating another methodology according to one or more embodiments of the present disclosure.
Figure 12:
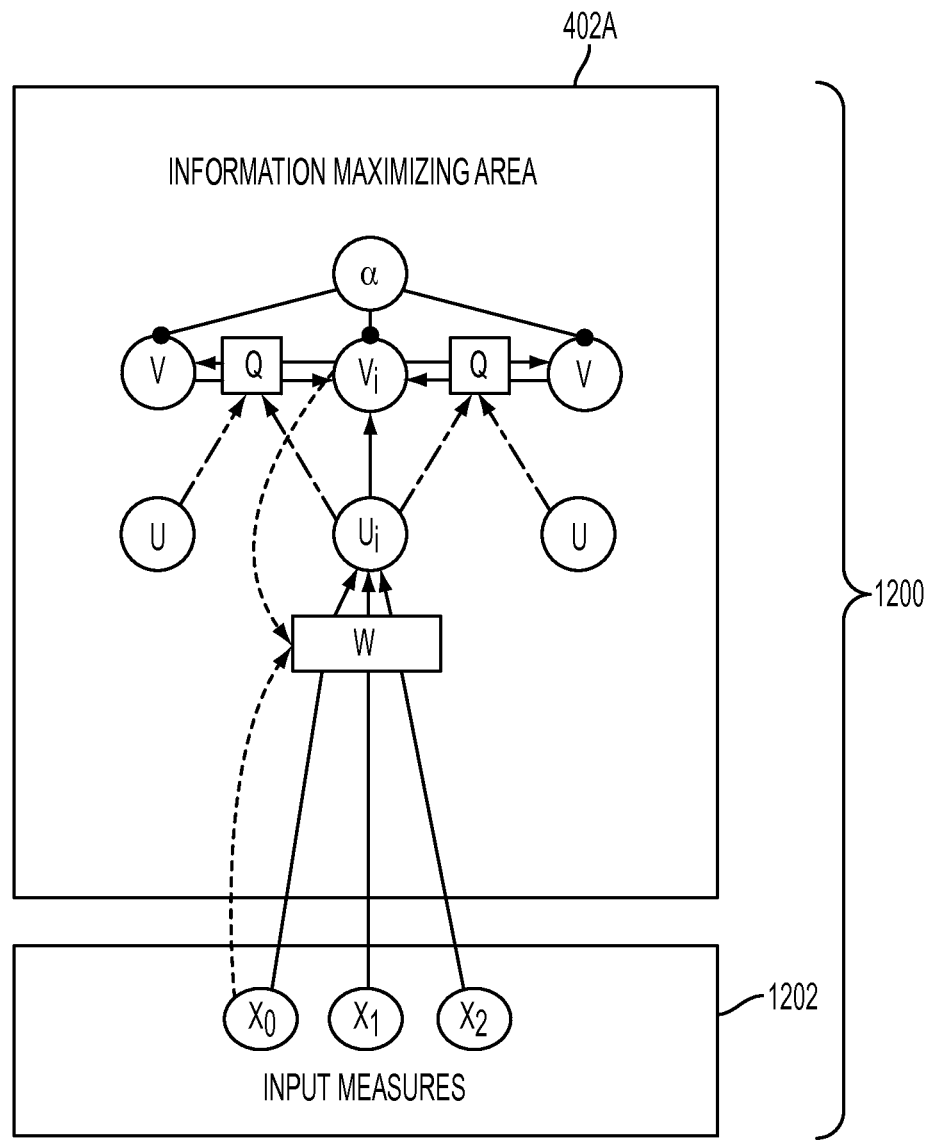
FIG. 12 depicts an example implementation of an information maximizing network, which is formed from an information maximizing area and input measures, and which is capable of being utilized by one or more embodiments of the present disclosure.

FIGS. 9-11 break the overall methodology of FIG. 8 into three parts in order to provide additional detail. More specifically, methodology 900 shown in FIG. 9 depicts process operations implemented by feed-forward, feed-back, and gating connections in network areas in accordance with one or more embodiments of the present disclosure. In general, methodology 900 describes the functioning of a network embodying the present disclosure over what might be described as a wave of activity propagating both in the feed-forward and feed-back directions. Methodology 900 begins at block 902 by gathering a first set of phenotypic measures. In block 904, features (e.g., output vectors) of a first IMA are modified by the gathered first phenotypic measures. In block 906, features (e.g., pulse rate setting) of the first IMA modify spiking in a first BA. In block 908 spikes in the first BA excite spikes in either a dis-inhibitory (D1) unit or an inhibitory (D2) unit of a FDG. Block 910 correlates (e.g., through spike timing correlation analysis) input behavioral spikes and D1 or D2 unit spikes that have been analyzed by grand loop STDP gating functionality. In block 912, the connection from a BA to a D1 or D2 unit is modified according to grand loop STDP gating function correlation analysis (e.g., spike timing correlation analysis). In other words, block 912 reads out the grand loop STDP gating functions and modifies connection from a BA to a D1 or D2 unit according to the correlation between pre and post spike times in accordance with STDP functionality. In block 914, either a D1 unit spike decreases inhibition to the gating unit or a D2 unit spikes increases inhibition to the gating unit. In block 916, spikes in the first BA traverse the gate if inhibition is low in order to feed spikes forward to a downstream BA. In block 918, spikes in a second BA directly evoke spikes in first BA through feed-back connections. Block 920 correlates (e.g., through spike timing correlation analysis) first BA and second BA spikes that have been analyzed by grand loop STDP gating functionality. In block 922, connections between first BA and second BA are modified according to local STDP functionality to eliminate local loops. In block 924, IMA measures features of feed-forward IMA features and feed-forward BA behavioral spikes. Thus, block 924 essentially folds the BA spiking measures into the IMA measures, an example of which is shown in FIG. 6B by the pulse rate measuring exchange between IMA 402 and BA 602. It is noted that because, in general, feed-back spikes in a second BA also evoke spikes in a first BA as depicted in block 918, spikes in a third BA (not shown) can be expected to evoke spikes in the second BA shown in block 918 and that these spikes would be similarly folded into the second IMA measures in block 924 (not shown).

Figure 17:
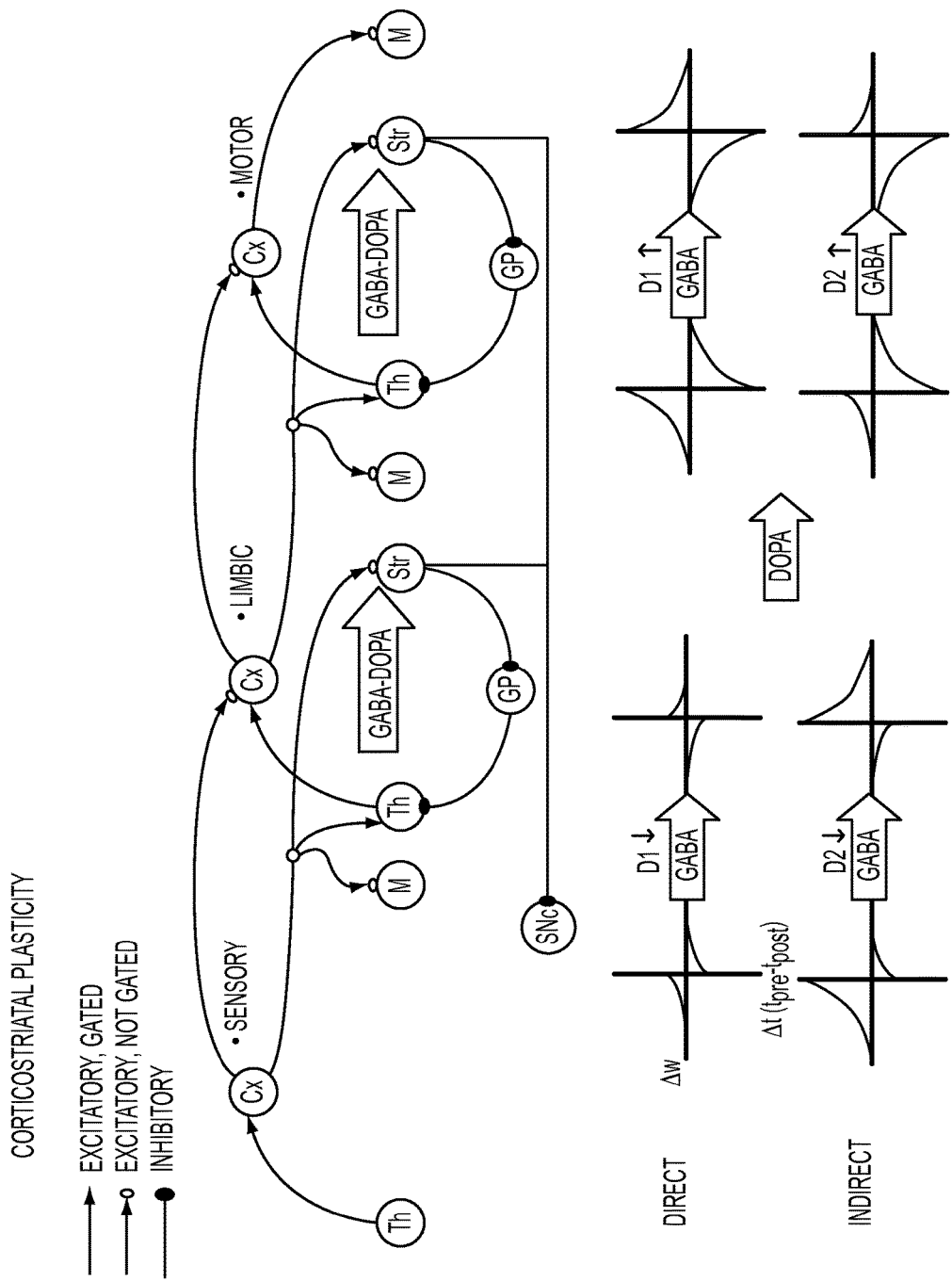
FIG. 17 depicts a diagram illustrating additional details of how STDP functionality may be implemented at a forward driver gate in accordance with one or more embodiments of the present disclosure.

Methodology 1000 shown in FIG. 10 depicts process operations implemented by forward driver gating units and modulators of STDP in accordance with one or more embodiments. Under the present disclosure, modulators of STDP give rise to the variety of STDP gating functions unique to the BA and FDG interface, an example of which is shown by inputs 710, 714 to grand loop STDP gating function 704 shown in FIG. 7B. Additional details about the variety of STDP gating functions unique to the BA and FDG interface is shown at the bottom of FIG. 17, which will be discussed in greater detail later in this disclosure.

Figure 18:
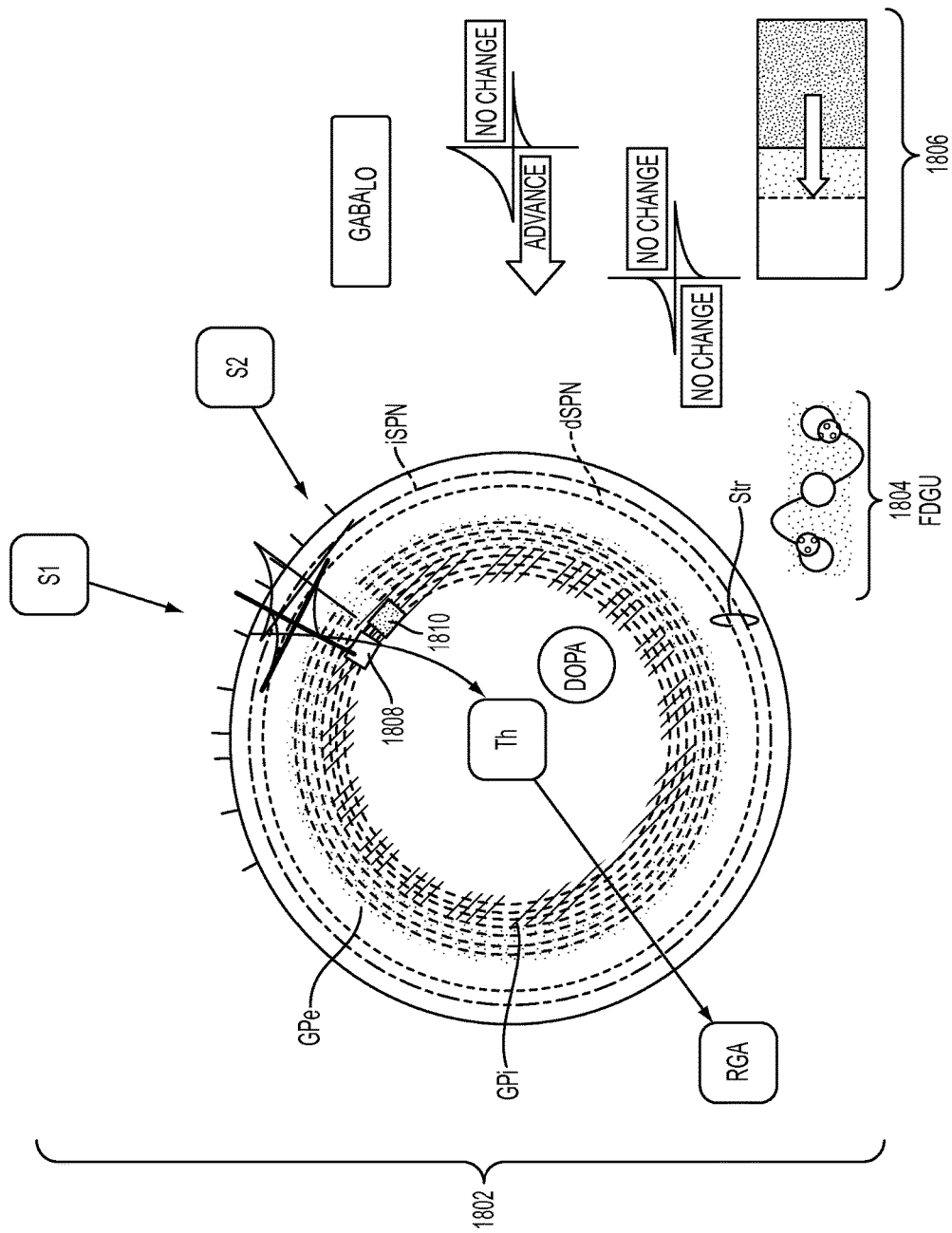
FIG. 18 depicts a circular diagram of time, which illustrates how a grand loop may be traversed repeatedly in accordance with one or more embodiments of the present disclosure.
Figure 19:
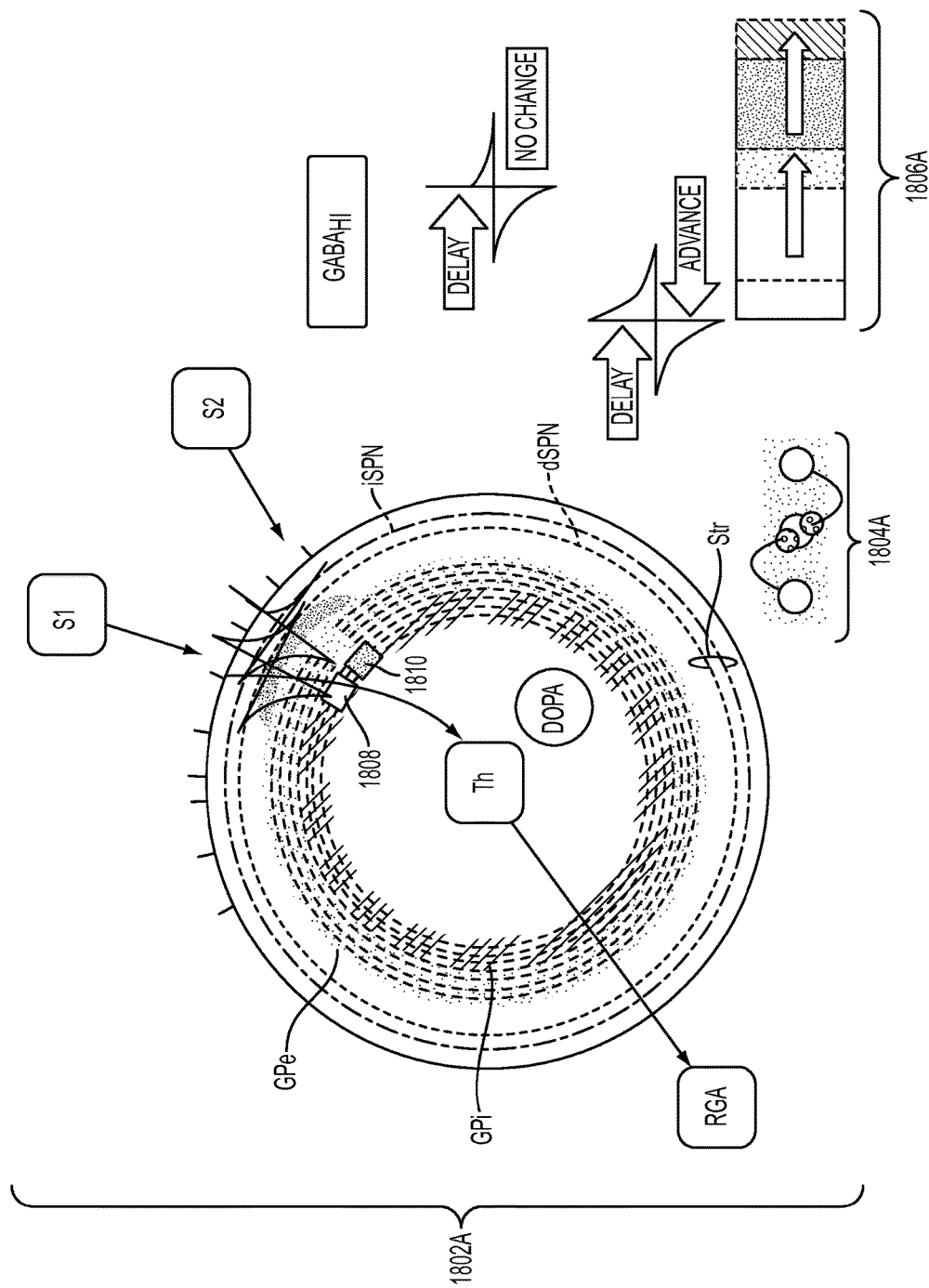
FIG. 19 depicts a circular diagram of time, which illustrates how a grand loop may be traversed repeatedly in accordance with one or more embodiments of the present disclosure.
Figure 20:
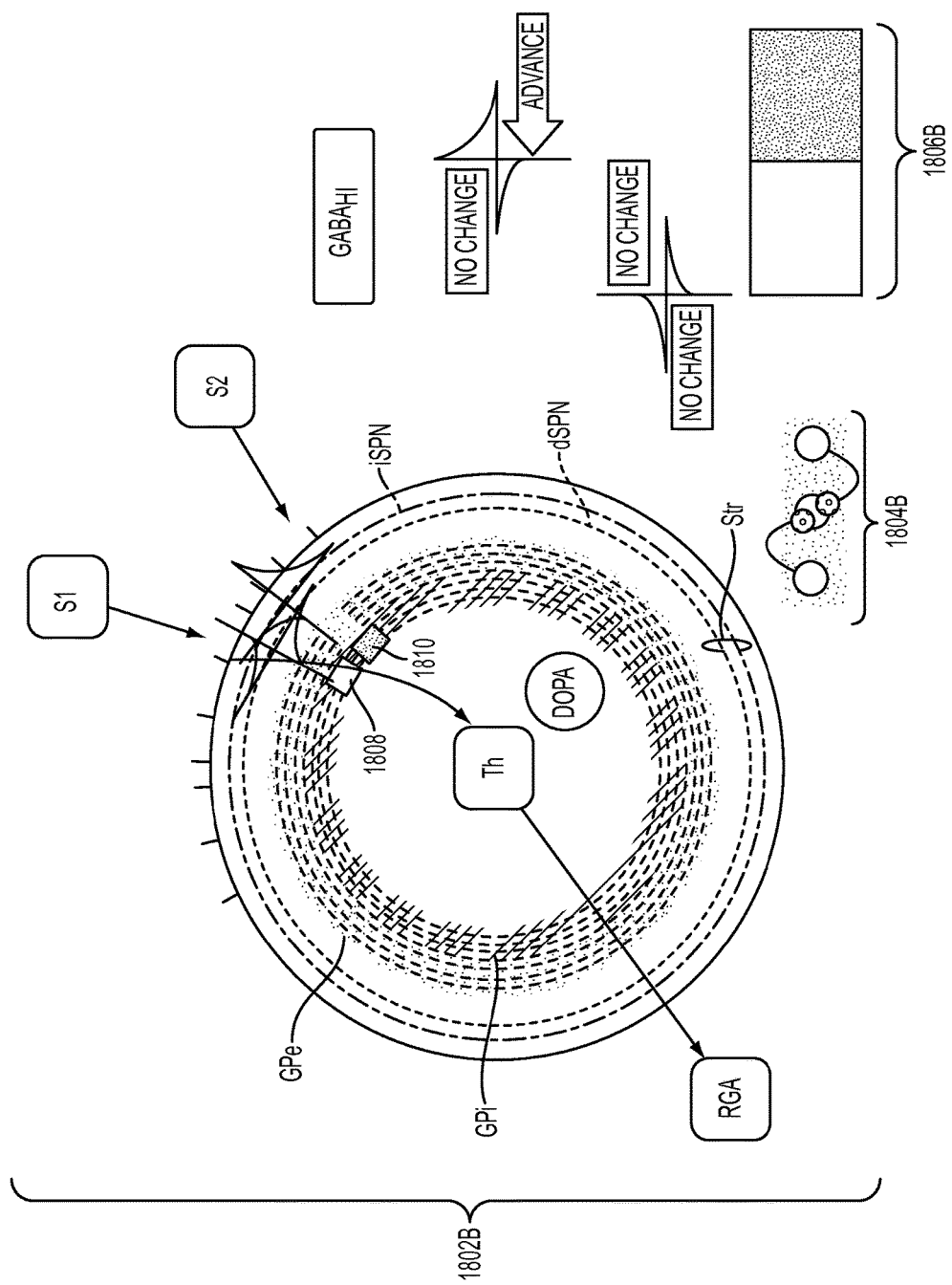
FIG. 20 depicts a circular diagram of time, which illustrates how a grand loop may be traversed repeatedly in accordance with one or more embodiments of the present disclosure.

As shown in FIG. 10, methodology 1000 begins at block 1002 by spikes in BAs (1 . . . n) exciting spikes in dis-inhibitory (D1) units and inhibitory (D2) units of an FDG. In block 1004, spikes in forward driver gating units exchange lateral inhibition through the local network. An example of this lateral inhibition exchange is depicted in by small diagrams at the bottom of FIGS. 18, 19 and 20 labeled as forward driver gating units (FDGUs) 1804, 1804A and 1804B. Although a more complete discussion of FIGS. 18, 19 and 20 is provided later in this disclosure, certain aspects of FIGS. 18, 19 and 20 will now be described for purposes of further illustrating the lateral inhibition of block 1004. In FIG. 18, the FDGU diagrams are shown as three nodes, wherein the center node represents a unit producing a modulator state referred to herein as GABA. As shown in FIG. 18, GABA modulator is produced by the unit that is active, so the GABA modulator input to the units receiving the GABA modulator state is depicted as a spotted circle. The GABA producing unit is producing GABA in FIG. 18, which it is relaying along the curved sinusoidal line through its local lateral inhibitory network to its neighboring nodes. Because the GABA producing node is producing GABA and not receiving GABA, which allows it to spike because it is not inhibited, it is in a modulator state referred to herein as $GABA_{LO}$. In FIGS. 19 and 20, the GABA node is in a $GABA_{HI}$ state because it is receiving GABA from the local network. Returning now to methodology 1000, in block 1006, the local network arrives at state by virtue of its exchange of GABA, wherein a subset of units receives inhibitory modulation (e.g., GABA) and stop spiking. In block 1008, local network arrives at state, also by virtue of its exchange of GABA, wherein a subset of units provides inhibitory modulation and continue spiking.

Figure 21:
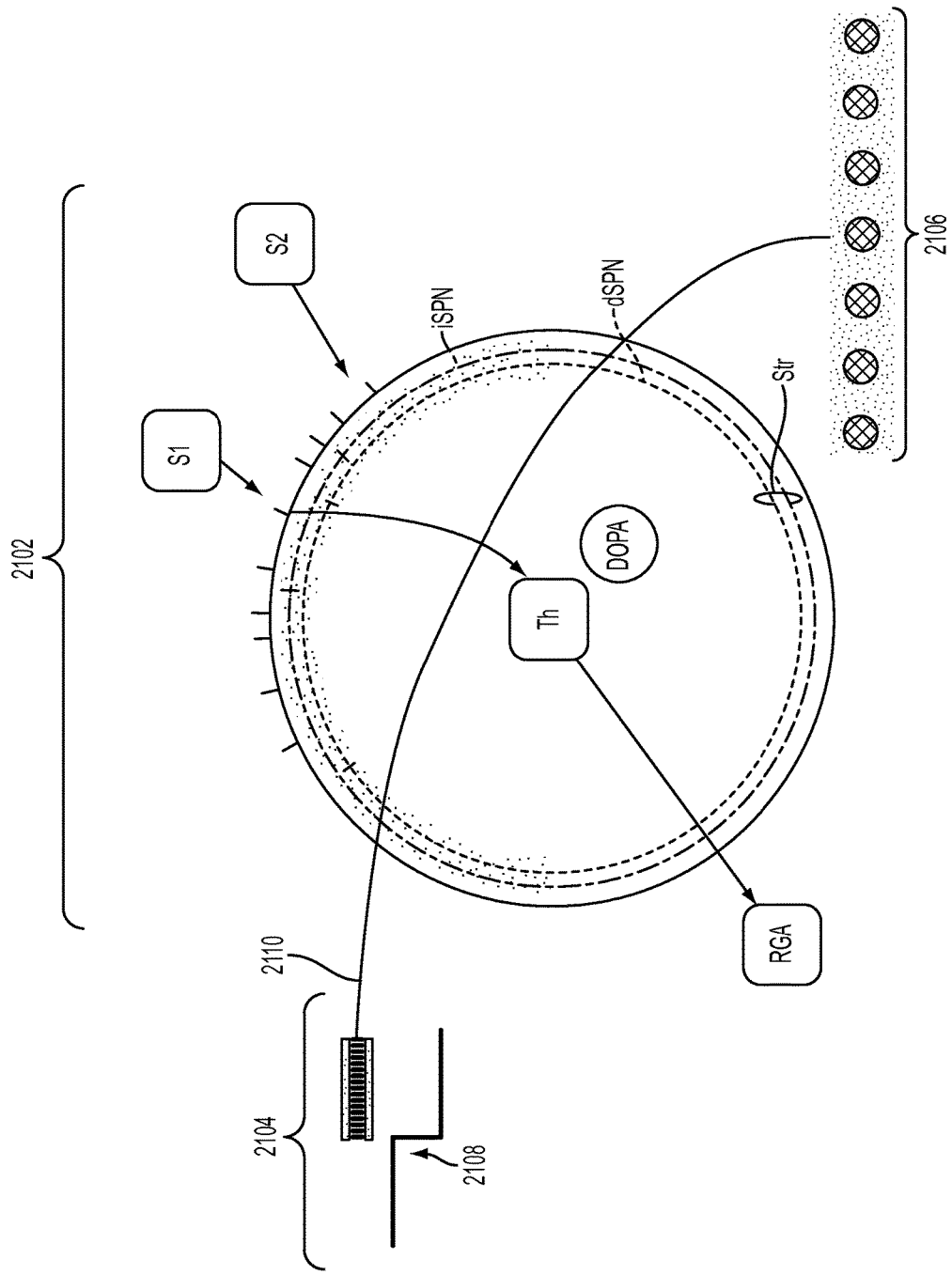
FIG. 21 depicts a diagram illustrating the source of modulatory input to forward gating STDP in accordance with one or more embodiments of the present disclosure.
Figure 22:
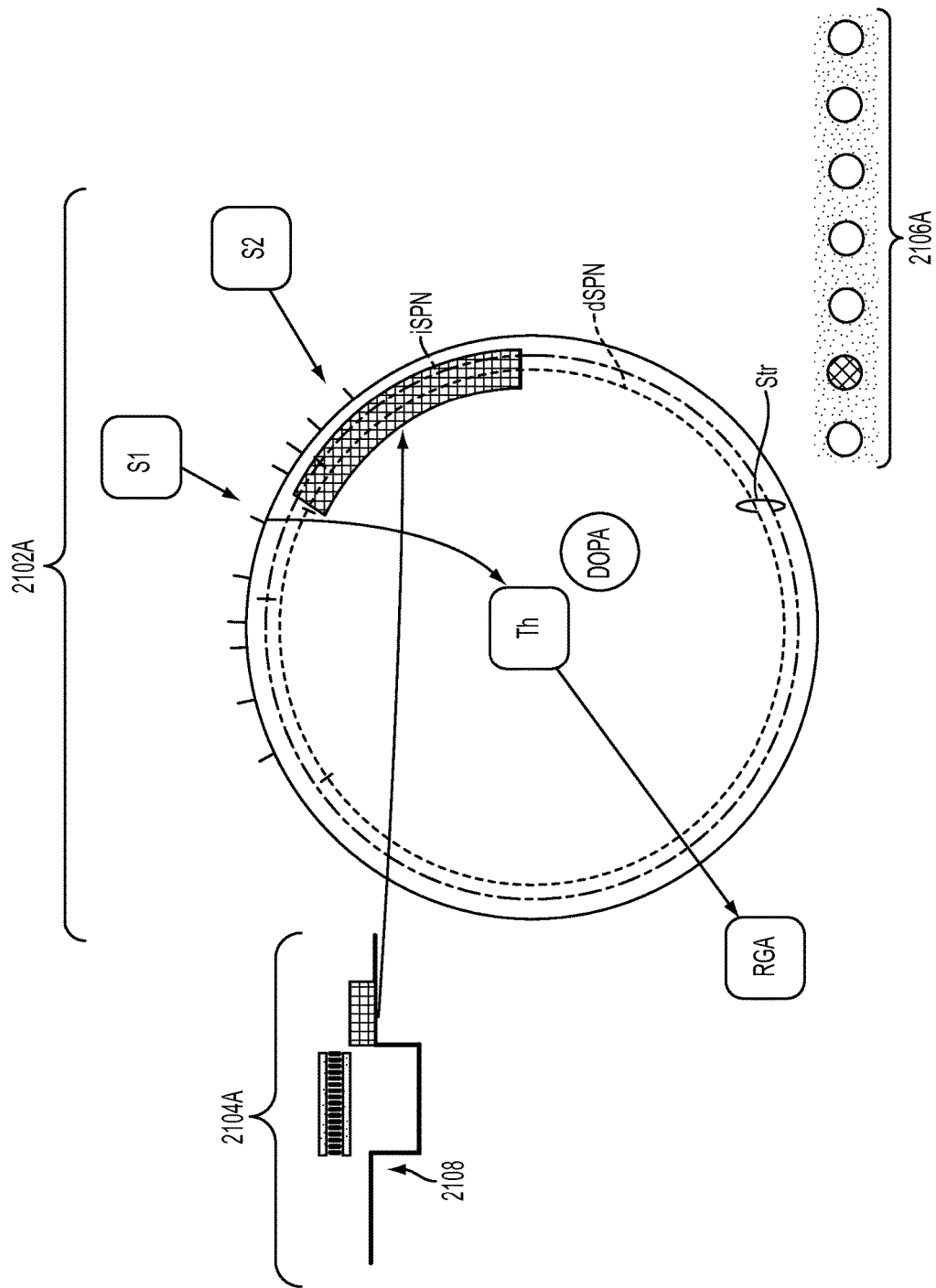
FIG. 22 depicts another diagram illustrating the source of modulatory input to forward gating STDP in accordance with one or more embodiments of the present disclosure.

In block 1010, secondary modulators receive copy of inhibition from spiking subset of forward driving gating units. Although a more complete discussion of FIGS. 21 and 22 are provided later in this disclosure, certain aspects of FIGS. 21 and 22 will now be described for purposes of further illustrating the secondary modulators of block 1010. The secondary modulators, which are integrators/units, are referred to in FIGS. 21 and 22 as DOPA, and are depicted graphically at 2104, 2104A of the small diagrams at the far left of FIGS. 21 and 22. Line 2108 represents the secondary modulator unit's state, which can be high or low, as shown. The low state corresponds to the secondary modulator receiving inhibition from the spikes produced by the gating unit network. Thus, the gating units, when they spike, inhibit each other, secondary modulators, GPe (globus pallidus, external) and GPi (globus pallidus, internal). The function of receiving a copy of inhibition from spiking subset of forward driving gating unit is represented by line 2110 in FIG. 21.

In block 1012, secondary modulators integrate time of inhibition from spiking subset as a rebound current. As shown in FIG. 21, line 2108 starts high then goes low when it receives the inhibition from the gating units. In the low condition, there is a current that operates and builds up over time, integrating the inputs, and pulling line 2108 in the opposite direction. Beyond some maximum period of time of integration, and with persistent inhibition from gating units, the current begins to diminish again. Thus, the secondary modulators, in effect measure a time of inhibition such that when the inhibition is released, as shown in FIG. 22, if elapsed time of inhibition is between certain minimum and maximum values, then the rebound event is expressed because inhibition is released, and the unit, rather than simply restoring itself to the previous state, restores itself to a state at which it can spike (i.e., provide modulation). This timer is referred to herein as the rebound current. In block 1014, if the rebound current has integrated over a time interval T, any rapid release from inhibition causes rebound spiking Thus, rebound current is a measurement of the state of the system itself, wherein a gating vector has been present and inhibiting the secondary modulator for some minimum period of time then rapidly released. We further teach that the time interval T may itself be under modulatory control of effector outputs of the network. In this way, the network can control its rate of transitioning by modulating the criterion time interval T using certain effector outputs of the behavioral network.

Optionally, in block 1016, spiking is allowed if an extrinsic value signal is detected by secondary modulators. Thus, block 1016 provides a second, optional way to cause secondary modulators to spike by measuring an external value that acts as an excitatory input. In other words, secondary modulators may optionally be driven to spike through excitation. In block 1018, the grand loop STDP gating function's forward driver gating units are modified based on inhibitory (e.g., GABA) and secondary (e.g., DOPA) modulators. One possible set of GABA/DOPA criteria for modifying the grand loop STDP gating function is shown by the four diagrams at the bottom of FIG. 17. Other criteria are possible, provided that over time, the system will operate such that the sum of phase shifts of gating units is zero. For a DIRECT or INDIRECT forward gating unit, the grand loop STDP gating function is modified by choosing one of the four different STDP diagrams according to whether GABA modulation is high or low, and whether DOPA at D1 units is decreasing or increasing, or according to whether DOPA at D2 units is decreasing or increasing.

Methodology 1100 shown in FIG. 11 depicts process operations implemented by forward driver gating units to modify the STDP gating functions. Thus, methodology 1100 further describes the variety of STPD gating functions that are applied in FIG. 17. In addition to describing the STPD gating function that is selected, methodology 1100 also describes the effects of the selected STPD gating function, which are best depicted in FIGS. 18, 19 and 20. When choosing a specific gating function based on the DOPA/GABA correspondence, the gating response to a patterned input by a dSPN (i.e., dis-inhibit or D1) or an iSPN (i.e., inhibit or D2) is either phase advanced or phase delayed. Although any period may be used, in one or more embodiments of the present disclosure the period of interest is the grand loop because it escapes loop-eliminating STDP. This period furthermore matches a minimum duration interval of persistent inhibition required for the rebound event to be expressed in secondary modulators when inhibition is released (FIG. 22).

Methodology 1100 begins at block 1102 by receiving primary inhibitory modulator signals from the local gating unit's network. Block 1104 receives a second modulator signals from secondary modulators according to the rules in methodology 1000. In block 1106, if secondary modulator and not primary, adjust STDP to phase advance D1 response to periodic patterned inputs. In block 1108, if not primary modulator and not secondary modulator, adjust STDP to phase advance D2 response to periodic patterned inputs. In block 1110, if primary modulator and secondary modulator, adjust STDP to phase delay D1 and D2 responses to periodic patterned inputs. In block 1112, if primary modulator and not secondary modulator, adjust STDP to change neither D1 nor D2 phases of responses to periodic patterned inputs.

Turning now to a more detailed description of exemplary architectures for one or more disclosed embodiments, with a particular emphasis on the components illustrated at a block diagram level in FIGS. 4-7B, FIG. 12 depicts an example implementation of an information maximizing network 1200 formed from an information maximizing area 402A and input measures 1202. Information maximizing network 1200 maximizes an output vector ensemble comprising vectors "u" over some input vector ensemble comprising vectors "x." Note that units labeled "x" and "u" with subscripts correspond to elements of vectors "u" and "x" in this description. The effective learning rule is applied to the weights "W" (in linear algebraic terms, a matrix) such that the information the output vector ensemble conveys about the input vector ensemble is maximized. In practice, this is accomplished by maximizing the entropy of the output vector ensemble, such that the least informative response from a network would be an output that is always the same. The output that is represented in a neural network can be viewed as a vector, and if the vector output always points in the same direction, that is very uninformative. Thus, weight matrix (W) is dynamically changed in order to maximize the separation between any two output vectors "u" generated when the network is given any two input vectors "x". As noted above, FIG. 12 illustrates one example of an information maximizing network suitable for incorporation within one or more embodiments of the present disclosure. Additional details about information maximization network 1200 are disclosed in a publication titled "A Local Learning Rule That Enables Information Maximization for Arbitrary Input Distributions," by R. Linsker (1997) Neural Computation 9, pages 1661-1665, the entire disclosure of which is incorporated by reference herein.

Figure 13:
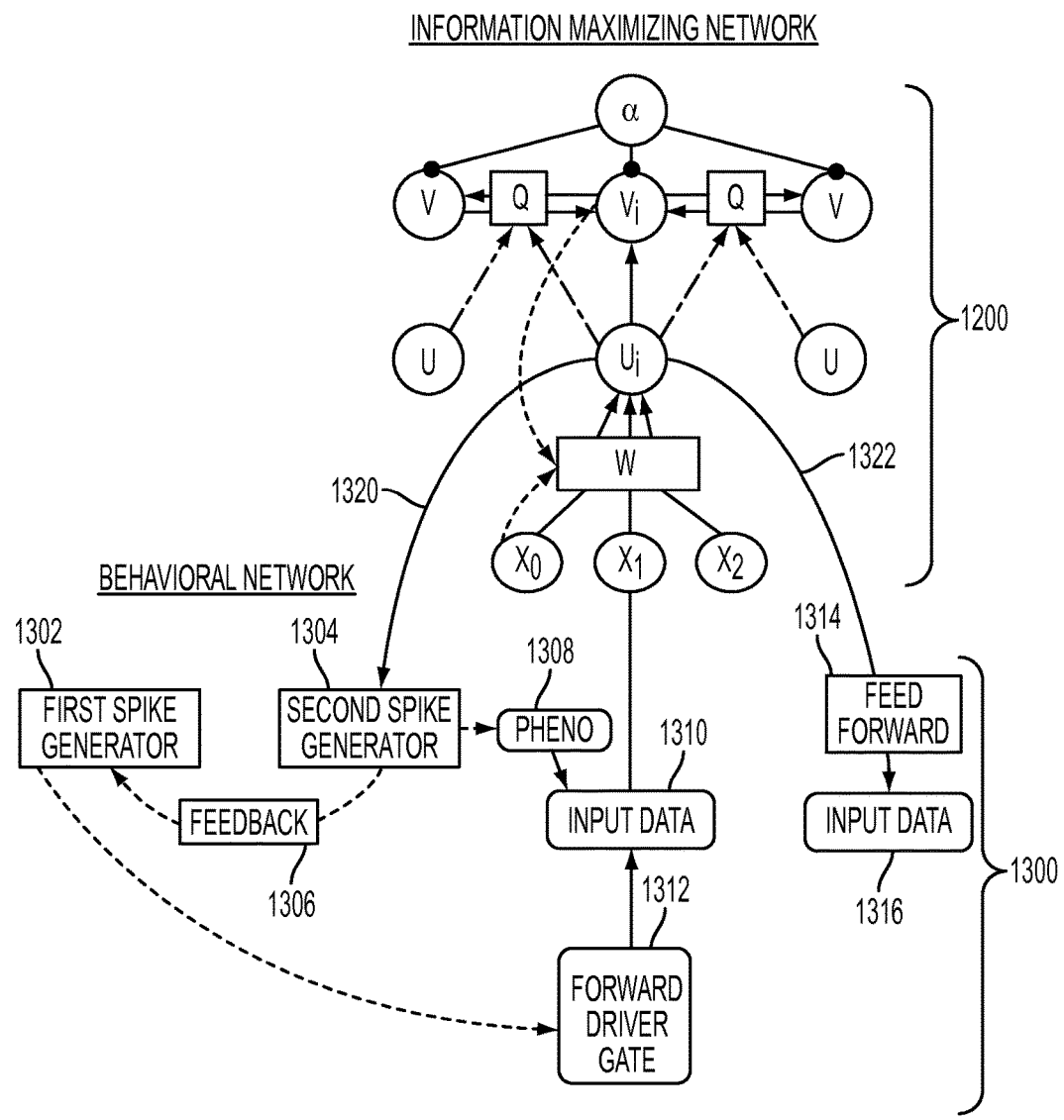
FIG. 13 depicts an example configuration of an information maximizing network and behavioral network capable of being utilized by one or more embodiments of the present disclosure.

FIG. 13 depicts an example configuration of information maximizing network 1200 and a behavioral network 1300 of one or more embodiments of the present disclosure. Behavioral network includes a first spike generator 1302, a second spike generator 1304, a feed-back path 1306, a phenotypic measurement 1308, input data 1310, a forward driver gate 1312, a feed-forward path 1314 and input data 1316, configured and arranged as shown. In general, behavioral network 1300 establishes a set of loops in a network that is "governed" by information maximizing network 1200. An example of this governed relationship is represented by a directional arrow 1320 extending from output element of "u" to spike generator 1304. As previously noted, spike generation involves what is known as a temporal or a time encoding machine. If element of "u" is a scalar (e.g., between zero and one), spike generator 1304 will generate spikes at a rate equal to some function of scalar element of "u." According to the present disclosure, behavioral network 1300 uses the spikes in a specific way. The governor of spike generator 1304 initially is the output element of "u" of information maximizing network 1200, which is maximizing information over input data 1310. Some of that input data 1310 is derived from effects of spike generator 1304. Thus, in accordance with the present disclosure, by connecting spike generators a shown in FIG. 13, it is possible to modify the input vector ensemble to information maximizing network 1200.

According to the network configuration shown in FIG. 13, control of spike generation is local to information maximizing unit 1200, and spikes can be relayed in several ways. For example, spikes can directly affect phenotype 1308 through effectors. More specific to the present disclosure, spikes can be directed in a feed-back connection from information maximizing network 1200 to an upstream network, or spikes can be directed in a gated feed-forward connection, an example of which is shown from spike generator 1302 to forward driver gate 1312.

Figure 14:
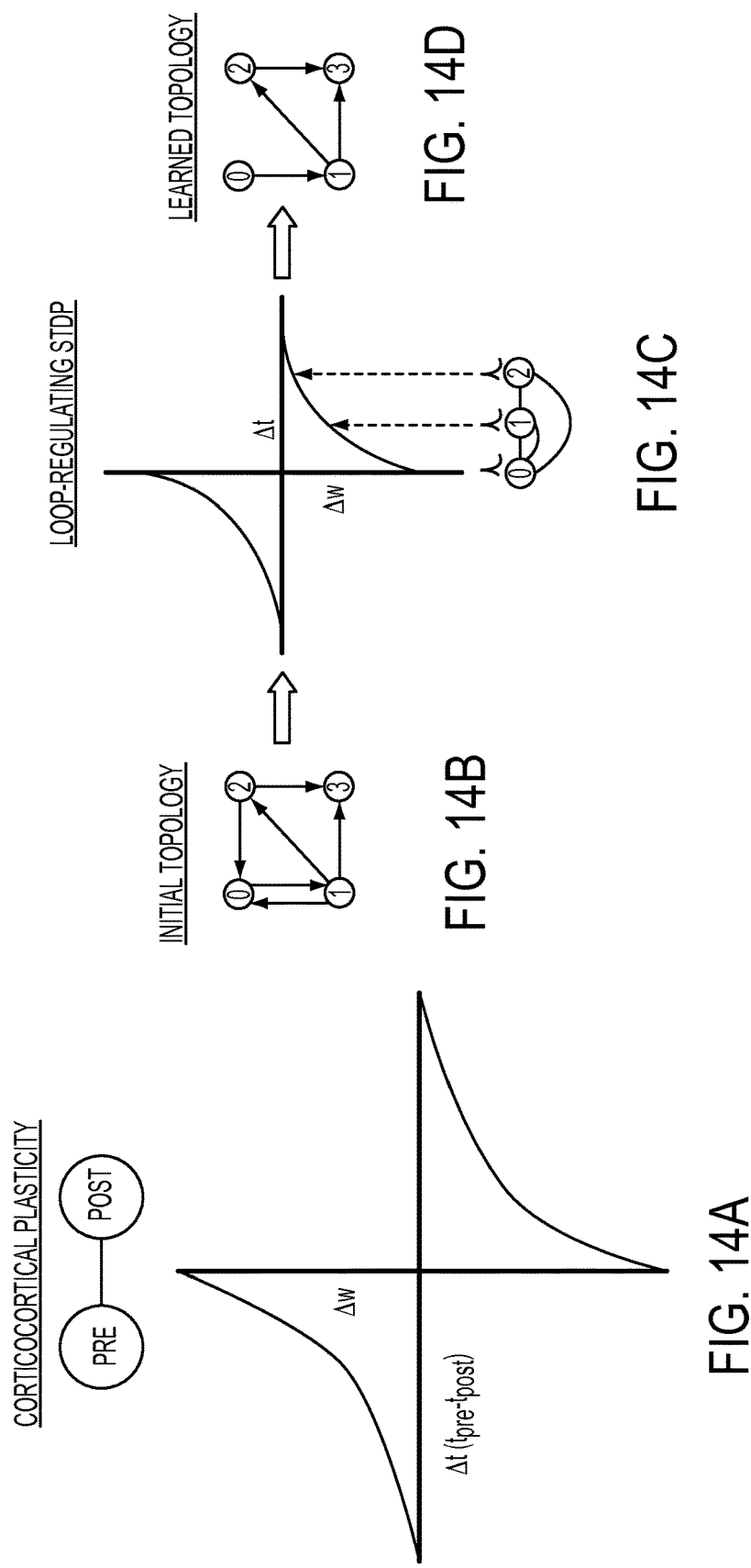
FIGS. 14A-D depict diagrams illustrating different portions of a loop regulating STDP function capable of being utilized by one or more embodiments of the present disclosure.

FIG. 13 is a simplified representation, and, in practice, information maximizing networks 1200, behavioral networks 1300 and spike generators 1302, 1304 are interconnected through a large number of pathways, many of which include loops. A learning rule, for example STDP, may be implemented to eliminate so-called local loops, which are loops that transmit signals within a certain duration. A more detailed example of STDP is illustrated in FIGS. 14A, 14B, 14C and 14D. As shown in FIG. 14A, spikes start at a pre-neuron (pre), propagate to a post-neuron (post) and can either evoke or not evoke the post neuron to fire based on the threshold for spiking at the post neuron. FIG. 14B, illustrates an initial loop topology that can result from the numerous paths that can exist in information maximizing network 1200 (shown in FIGS. 12 and 13) and behavioral network 1300 (shown in FIG. 13). FIG. 14C illustrates application of the STDP learning rule, and FIG. 14D illustrates a resulting learned topology wherein local loops beginning and ending at node "0" have been eliminated. A more complete discussion of local loop elimination through STDP is provided in a paper by Kozloski and Cecchi, titled "A Theory Of Loop Formation And Elimination By Spike Timing-Dependent Plasticity," published by Front Neural Circuits (Mar. 10, 2010), the entire disclosure of which is expressly incorporated herein by reference. Additional details of hardware implementations of STDP loop elimination are provided in U.S. Pat. No. 8,473,439 and U.S. Patent Application Publication Number US2012/0109864, and the entire disclosure of each reference is incorporated herein by reference.

Returning now to FIG. 13, having implemented both information maximization and loop elimination, information has been optimized. The configuration shown for behavioral network 1300 now takes the optimized information representation of network state and answers the fundamental question of what behavior to deploy (or more colloquially, "what to do about it"). Behavior in the closed-loop embodiment of the present invention then refers to transitioning of the network from the given state and its present optimized information to a subsequent state, conditional upon some previously learned useful transition. It is noted that the answers to this question are specifically implemented as spiking patterns and are also fed back into the information optimizing functionality of the architecture shown in FIG. 13 in order to provide even greater optimization of information given the current behavioral context. The operation of forward driver gate 1312 is a primary controller in making the determination of what to do about the optimized, local loop eliminated information. Forward driver gate 1312 also incorporates STDP, but it is not loop regulating because connections through forward driver gate 1312 are negative, and thus sustained recurrent looping signals are not possible. Instead, STDP serves to shift the phase of negative (inhibitory) gating spike inputs to gate 706 (shown in FIG. 7B) relative to a periodic input pattern of positive spike arrival times from various spike generators in the network trying to traverse forward driver gate 1312. The phase shifts are controlled by two types of negative gating spikes, one (direct/dSPN shown in FIGS. 18-20) that produces a pause in a tonic closed signal from GPi (gate open), and another (indirect/iSPN shown in FIGS. 18-20) that produces an increase to the tonic closed signal from GPi via a pause in a tonic negative signal in GPe, which means the gate is closed.

The independent control of negative gating open and closed phases is controlled as follows by these two pathways. Subject to an additional modulator (e.g., DOPA) and a local competition (e.g., GABA), phase shifts for "local winner" gates in the presence of the modulator are now described. It is noted that competition is determined by lateral inhibition between units and is known in the art, such as in a Kohonen network. Phase shifts are advancing for dSPN units and constant for iSPN units, effectively separating the gate open and gate closed windows in time, and ensuring the gating window remains open when activated. When the modulator is withdrawn, the dSPN phase remains constant, whereas the iSPN phase is advanced. In this way, the "gate closed" window advances to occlude the "gate open" window and the looping signal is terminated. For "losers" of the local competition in the presence of the modulator, phase shifts are delaying for both dSPN and iSPN. In the absence of the modulator, phase shifts for all "losers" are zero. As previously noted, the concepts of "competition," "winners," and "losers" are used herein as one embodiment of the network. Other "winnerless" spiking networks described in the art may also be used, wherein the relative level of inhibition can still provide the necessary modulation categories for determining phase shifts and their direction. Furthermore, patterns of lateral connections need not follow those of a Kohonen network, and, for example, may be sparse.

The modulatory input to forward gating STDP is driven positively, and infrequently, by external measures of value. In the closed loop system of the present disclosure, the drivers are negative from large populations of dSPN and iSPN spikes. When this inhibition is for a certain duration and then relieved, the modulator signal is present and strong (rebound spiking). This biases the system to gating functions that maximize the entropy of dSPN and iSPN spiking activity over time (i.e., maximize rapid orthogonal shifts in their gating vectors), as well as the entropy of the transitions between grand loops dSPN and iSPN controls via their gating functions. The controls on rebound from inhibition (e.g., integration times of activation, inactivation, unit compartmentalization, etc.) further bias the system to gating functions that change their gating vectors at particular intervals (e.g., every several hundred milliseconds) corresponding to the temporal constraints imposed by these controls.

Figure 15:
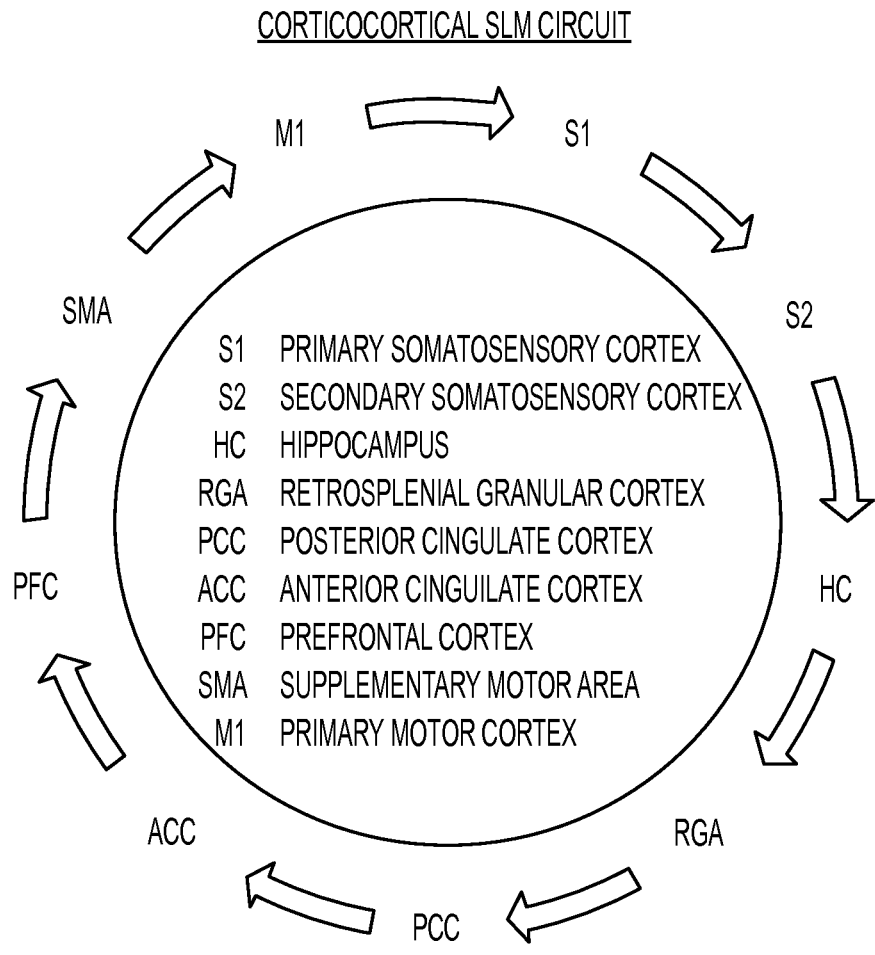
FIG. 15 depicts a diagram illustrating various aspects of a grand loop covering the sensory, limbic and motor areas of a human brain, concepts of which are capable of being utilized in connection with one or more embodiments of the present disclosure.

Some loops within a given system (e.g., human brain 200 shown in FIG. 2) are sufficiently long enough that they are not eliminated by the application of local STDP. Within the brain, for example, such loops may be referenced collectively as grand loops. FIG. 15 depicts a diagram illustrating various aspects of a grand loop covering the sensory, limbic and motor (SLM) areas of the brain, concepts of which are capable of being utilized in connection with one or more embodiments of the present disclosure. The loops that are long enough to not be eliminated by STDP are loops that are involved in traversing large areas of the brain and large regions of information maximizing networks. In general, the various areas listed in FIG. 15 correspond to information maximizing areas and behavioral areas described earlier in this disclosure in connection with FIGS. 4-7B, 12 and 13. In accordance with the present disclosure, the forward driver gate 1312 (shown in FIG. 13) functions to route signals through certain grand loops by opening and closing different nodes in the feed-forward, forward driver gate connection in behavioral network 1300 (shown in FIG. 13) in order to allow certain spikes to pass and certain spikes not to pass.

Figure 16:
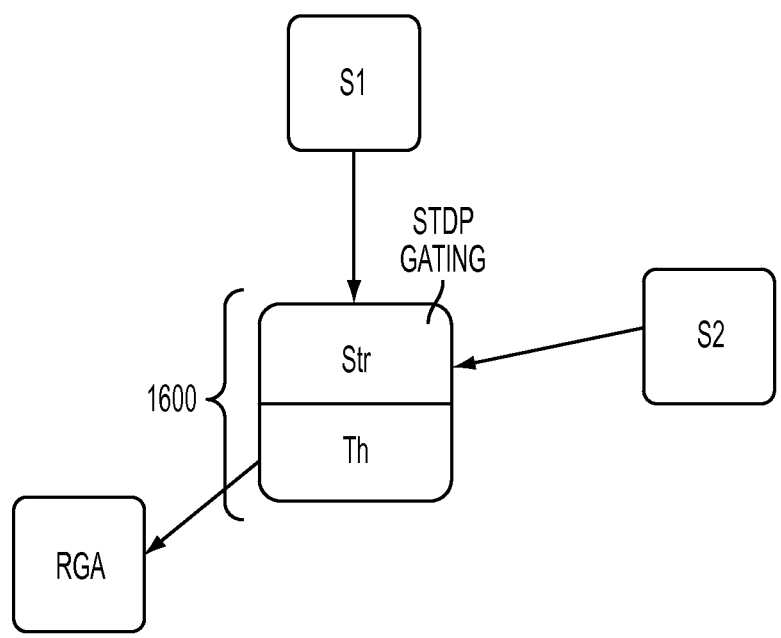
FIG. 16 depicts a diagram further illustrating an exemplary configuration of a forward driver gate capable of being utilized by one or more embodiments of the present disclosure.

FIG. 16 depicts a diagram further illustrating an exemplary configuration of a forward driver gate 1600 capable of being utilized by one or more embodiments of the present disclosure. As previously noted herein, the present disclosure is directed to a computer system architecture. However, for ease of reference and explanation, various aspects of the disclosed computer system architecture are described using neurological terminology such as neurons, synapses, DOPA and GABA, for example. It will be understood that for any discussion or illustration herein of a computer system architecture, the use of neurological terminology or neurological shorthand are for ease of reference and are meant to cover the pulsed neural network equivalent of the described neurological function or neurological component. The functionality of forward driver gate 1600 is presented in FIG. 17 by Str and Th, which are shorthand notations for Striatum and Thalamus, respectively. Forward driver gate 1600 gates grand loops connecting different areas of a network, shown in FIG. 17 as S1, S2 and RGA. In order to go from S2 to RGA in a grand loop, S2 must traverse through Th, which is under the inhibitory control of Str. This means that Str is receiving inputs from S1 and S2 and based on its internal weight matrix is determining whether or not to inhibit Th. If Str's effect is inhibiting Th, any signals from S1 or S2 that are attempting to traverse Th to arrive at RGA are blocked. If Str's effect is dis-inhibiting Th, any signals from S1 or S2 that are attempting to traverse Th to arrive at RGA can do so.

A more detailed representation of the functionality of forward driver gate 1600 of FIG. 16 is shown by the diagram at the top of FIG. 17. In FIG. 17, Cx is any unit in a behavioral network that must traverse forward driver gate 1600 (shown in FIG. 16), which is represented as the collective functionality of Str (Striatum), GP (Globus Pallidus) and Th (Thalamus). The connections from Cx to Cx across the top of FIG. 17 are feed-forward information maximization connections between registered IMA units also associated with Cx, and are not directly relevant to forward driver gate 1600. For example, if a spike generating unit such as Cx Sensory in a behavioral network is to relay a feed-forward signal to another Cx unit such as Cx Limbic, the signal must traverse from Cx Sensory through Th and then to Cx Limbic. However, Th is under inhibitory control of GP, which is under inhibitory control of Str, which is receiving the same input from Cx Sensory. Thus, Str is undergoing a form of STDP learning, wherein Str receives inputs from many regions of Cx. Whether signals traverse Th successfully will then depend on Str's effect on Th and whether the Th gate is thereby either open or closed. If, for example, GP is always inhibiting Th, Str can influence GP by firing a short burst of spikes, which makes GP pause. When GP pauses, its inhibition of Th pauses, and a window opens through which any spike from Cx Sensory can traverse and then arrive at Cx Limbic. This function of GP is under the control of one type of Str neuron, which is referred to herein as DIRECT.

There is also a competing gate (not shown in FIG. 17) that attempts to reclose GP after it has been opened. Thus, GP can be considered to exist in two stages, which may be labeled for convenience as GPe and GPi (shown in FIG. 18). Thus, if Str inhibits GP, there is a way to in effect make GP's rate go up instead of down through another type of Str neuron, which is referred to herein as INDIRECT. The interplay of modulatory inputs, grand loop STDP, and DIRECT and INDIRECT is shown by the four graphs at the bottom of FIG. 17, as well as the diagrams shown in FIGS. 18, 19 and 20. One possible set of GABA/DOPA criteria for modifying the grand loop STDP gating function is shown by the four diagrams at the bottom of FIG. 17. Other criteria are possible, provided that over time, the system will operate such that the sum of phase shifts of gating units is zero. For a DIRECT or INDIRECT forward gating unit, the grand loop STDP gating function is modified by choosing one of the four different STDP diagrams according to whether GABA modulation is high or low, and whether DOPA at D1 units is decreasing or increasing, or according to whether DOPA at D2 units is decreasing or increasing. For a Str gate, the four diagrams at the bottom of FIG. 17 illustrate what happens when the state moves from no-DOPA to DOPA (shown by the directional arrow labeled DOPA) for both the DIRECT and INDIRECT states. The DIRECT pathway is different from the INDIRECT pathway in terms of the shapes of grand loop STDP functions. The DIRECT STDP function is essentially symmetric over the x-axis. The INDIRECT STDP function is essentially asymmetric over the x-axis.

Referring now to FIG. 18, there is shown a group of related diagrams, 1802, 1804, 1806, which together convey the concept of periodic patterned inputs. Diagram 1802 is the central diagram and may be referred to as a circular diagram of time, which shows how a grand loop is traversed repeatedly by spiking patterns in behavioral areas. Diagram 1802 includes two circular annuli, labeled GPe and GPi. GPi inhibits Th and will either open or close forward driver gate 1600 (shown in FIG. 16). An open window (dis-inhibited) for GPi is shown by the area 1808, and a closed window with higher inhibition for GPi is shown by the area 1810.

Thus, Str may be considered in two parts, a DIRECT Str gate and an INDIRECT Str gate. The INDIRECT Str gate inhibits GPe, which disinhibits GPi, which results in a closed gate state (i.e., area 1810). The DIRECT Str gate directly inhibits GPi, which results in an open gate state (i.e., area 1808). Both types of Str gates, INDIRECT and DIRECT, have a momentary effect on gating in Th. INDIRECT closes the Th gate, and DIRECT opens the Th gate. Diagrams 1802, 1802A, 1802B, 1804, 1804A, 1804B, 1806, 1806A, 1806B shown in FIGS. 18, 19 and 20 represent different conditions of the INDIRECT and DIRECT Str gates. The independent control of negative (inhibitory) gating open and closed phases is controlled as follows by these two pathways. Subject to an additional modulator (e.g., DOPA) and a local competition (e.g., GABA), phase shifts for "local winner" units in the presence of the modulator are now described. It is noted that competition is determined by lateral inhibition between units and is known in the art, such as in a Kohonen network. Phase shifts are advancing for dSPN units and constant for iSPN units, effectively separating the gate open and gate closed windows in time, and ensuring the gating window remains open when activated. When the modulator is withdrawn, the dSPN phase remains constant, whereas the iSPN phase is advanced. In this way, the "gate closed" window advances to occlude the "gate open" window and the looping signal is terminated. For "losers" of the local competition in the presence of the modulator, phase shifts are delaying for both dSPN and iSPN. In the absence of the modulator, phase shifts for all "losers" are zero. It is noted that the concepts of "competition," "winners," and "losers" are used herein as one embodiment of the network. Other "winnerless" spiking networks described in the art may also be used, wherein the relative level of inhibition can still provide the necessary modulation categories for determining phase shifts and their direction. Furthermore, patterns of lateral connections need not follow those of a Kohonen network, and, for example, may be sparse.

FIGS. 21 and 22 depict diagrams, 2102, 2102A, 2104, 2104A, 2106, 2106A illustrating the source of modulatory input to forward gating STDP in accordance with one or more embodiments of the present disclosure. The source of modulatory input to forward gating STDP is driven positively, and infrequently, by external measures of value. In the closed loop system of the present disclosure, the drivers are negative from large populations of dSPN and iSPN spikes. When this inhibition is relieved, the modulator signal is present and strong (rebound spiking) This biases the system to gating functions that maximize the entropy of dSPN and iSPN spiking activity over time (i.e., maximize rapid orthogonal shifts in their gating vectors), as well as the entropy of the transitions between grand loops dSPN and iSPN controls via their gating functions. The controls on rebound from inhibition (e.g., integration times of activation, inactivation, unit compartmentalization, etc.) further bias the system to gating functions that change their gating vectors at particular intervals (e.g., every several hundred milliseconds) corresponding to the temporal constraints imposed by these controls.

Thus, it can be seen from the foregoing detailed description and accompanying drawings that the present disclosure is directed to modeling biological neural systems using computer systems that implement a type of pulsed artificial neural network referred to in the present disclosure as an information-based exchange (IBEX) network having temporal encoders and informative looping signals. Technical benefits of the present disclosure include an architecture that does not require imposed value functions for closed loop functions. Additionally, relatively fast learning results are obtained from loop propagation and discovery of gating functions that maximize entropy and diversity of all traversals across information maximizing areas. Behaviors and network dynamics are deployed as a coding scheme and as a means to measure usefulness of codes. Categories emerge through unsupervised learning of high entropy loop traversals that terminate other loops (i.e., elimination of threats). Open loop control problems are mapped to an internal set of closed loop selection mechanisms. State estimator components are more robust and undergo rapid reorganization when conditions for loop selection change. Multiple latencies for behavior initiation and termination are available because of the extremely large number of looping states and the availability of certain states that do not evoke an external behavior, but only serve to constrain state transitions towards certain behavioral outcomes and not others.

Referring now to FIG. 23, a computer program product 2300 in accordance with an embodiment that includes a computer readable storage medium 2302 and program instructions 2304 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method of implementing a network having pathways, the method comprising:

communicatively coupling a plurality of units to each other through primary network pathways;

communicatively coupling an inhibitory gate controller to the plurality of units and the primary network pathways through auxiliary pathways;

the inhibitory gate controller comprising a gate and spike-timing dependent plasticity (STDP) functionality configured to control the gate;

applying a local (STDP) function to transmissions over the primary network pathways between a first unit of the plurality of units and a second unit of the plurality of units;

configuring the inhibitory gate controller to receive inputs over the auxiliary pathways and selectively open or close the gate of the inhibitory gate controller to either output the received inputs or not output the received inputs;

identifying, by the inhibitory gate controller, informative looping signals in loops formed from a plurality of the primary network pathways that connect the first unit to the second unit;

configuring the inhibitory gate controller to use its STDP functionality to apply an STDP-dependent inhibitory gating function to inputs received at the inhibitory gate controller from the plurality of primary network pathways;

phase shifting the inhibitory gate by applying the STDP-dependent inhibitory gating function to open gate outputs of the inhibitory gate controller and close gate outputs of the inhibitory gate controller; and making at least one of a rate and a direction of the phase shift dependent on a modulatory signal;

wherein the modulatory signal is, through use of a recurrent learning algorithm, a source of a change in the STDP-dependent inhibitory gating;

wherein the modulatory signal represents reward in the recurrent learning algorithm;

wherein the modulatory signal controls learning of the usefulness of the change in the STDP-dependent inhibitory gating.

2. The method of claim 1, wherein the first unit and the second unit each comprise temporal encoders.

3. The method of claim 2, wherein the temporal encoders selectively drive behavior selection through a coupling of the temporal encoders to a set of external effectors.

4. The method of claim 2, further comprising applying information maximization to modulate spike rates of the temporal encoders.

5. The method of claim 2, further comprising selecting spike timings of the temporal encoders as a function of a distribution of feed-forward and feed-back spike times under control of the local STDP function.

6. The method of claim 1, wherein the modulatory signal is based at least in part on an external measure.

7. The method of claim 1, wherein the change occurs after a predetermined time interval that is controlled by network effectors.

* * * * *